US011366262B2

(12) United States Patent
Yagi et al.

(10) Patent No.: US 11,366,262 B2
(45) Date of Patent: Jun. 21, 2022

(54) LIGHTING DEVICE AND DISPLAY DEVICE

(71) Applicant: SHARP KABUSHIKI KAISHA, Sakai (JP)

(72) Inventors: Shugo Yagi, Sakai (JP); Yuuichi Kanbayashi, Sakai (JP); Satoshi Tsubooka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/205,791

(22) Filed: Mar. 18, 2021

(65) Prior Publication Data

US 2021/0311242 A1    Oct. 7, 2021

(30) Foreign Application Priority Data

Apr. 3, 2020   (JP) .............................. JP2020-067626

(51) Int. Cl.
*F21V 8/00*   (2006.01)
*G02F 1/1335*   (2006.01)

(52) U.S. Cl.
CPC ....... *G02B 6/003* (2013.01); *G02F 1/133524* (2013.01); *G02B 6/0073* (2013.01)

(58) Field of Classification Search
CPC .. G02B 6/003; G02B 6/0073; G02F 1/133524
See application file for complete search history.

(56) References Cited

U.S. PATENT DOCUMENTS

| 2011/0221998 A1* | 9/2011 | Adachi ............... G02B 6/0038 |
| | | 362/19 |
| 2014/0286043 A1* | 9/2014 | Sykora ............... G02B 27/0972 |
| | | 362/333 |
| 2018/0203177 A1* | 7/2018 | Kang .................. G02B 6/0036 |

FOREIGN PATENT DOCUMENTS

JP   2020-021640 A   2/2020

\* cited by examiner

*Primary Examiner* — Mary Ellen Bowman
(74) *Attorney, Agent, or Firm* — ScienBiziP, P.C.

(57) ABSTRACT

A lighting device includes light sources and a light guide plate. The light guide plate includes a base portion and a light collecting portion. The base portion includes a light entering surface and a light exiting surface. The light collecting portion protrudes from the light exiting surface. The light collecting portion includes light collecting sections elongated in a first direction parallel to a normal direction to the light entering surface and arranged in a second direction perpendicular to the first direction. The light collecting sections perform linearity adjustment to rays of light so that the rays of light travel along the first direction. The light collecting sections include first light collecting regions and second light collecting regions. The second light collecting regions perform the linearity adjustment at a degree greater than a degree of the linearity adjustment by the first light collecting regions.

20 Claims, 26 Drawing Sheets

FIG.14 SAMPLE 4 16°

FIG.20

|  |  | EMBODIMENT 1 | COMPARATIVE EXAMPLE 1 | COMPARATIVE EXAMPLE 2 |
|---|---|---|---|---|
| ANGLE OF TANGENT | 1ST LIGHT COLLECTING REGION | 49° | 49° | 63° |
|  | 2ND LIGHT COLLECTING REGION | 67° |  |  |
| AVERAGE OF Cm VALUES | | 0.0071 | 0.0066 | 0.0094 |
| EVALUATION | | FAIR | FAIR | BAD |

FIG.21

| | EMBODIMENT 1 | COMPARATIVE EXAMPLE 1 | COMPARATIVE EXAMPLE 2 |
|---|---|---|---|
| ANGLE OF TANGENT — 1ST LIGHT COLLECTING REGION | 49° | 49° | 63° |
| ANGLE OF TANGENT — 2ND LIGHT COLLECTING REGION | 67° | | |
| IMAGE | | | |
| MAXIMUM Cm VALUE | 0.037 | 0.067 | 0.039 |
| EVALUATION | GOOD | BAD | GOOD |

LIGHTING DEVICE AND DISPLAY DEVICE

CROSS-REFERENCE TO RELATED APPLICATION

This application claims priority from Japanese patent application No. 2020-067626 filed on Apr. 3, 2020. The entire contents of the priority application are incorporated herein by reference.

TECHNICAL FIELD

The technology described herein relates to a lighting device and a display device.

BACKGROUND

An example of backlights for liquid crystal display devices may include a light guide plate, light sources, a light entering prism, a vertical prism, and optical path changing members. The light guide plate may include a side surface defined as a light entering surface and two main surfaces. The light sources may include one light source that emits light in a different color from the color of light emitted by other light sources. The light sources may be disposed along the light entering surface. The light entering prism may be disposed on the light entering surface. The light entering prism may guide some of rays of light from the light sources in a first direction and the rest of rays of light in a second direction. The first direction may be substantially parallel to the light entering surface. The second direction may be substantially perpendicular to the light entering surface. The vertical prism may extend in a direction substantially perpendicular to the light entering surface. The vertical prism may have an irregular shape in a cross section along a direction that crossed the direction in which the vertical prism may extend. The vertical prism may be disposed on one of the main surfaces. The optical path changing members may be disposed on the other one of the main surfaces to change light paths inside the light guide plate. Japanese Unexamined Patent Application Publication No. 2020-21640 may disclose an example of such a backlight.

The vertical prism disposed on the main surface, which may be a light exiting surface of the light guide plate, may irregularly diffuse the ray of light relative to the direction substantially parallel to the light entering surface. This may reduce light use efficiency and cause a decrease in luminance of exiting light. To increase the light use efficiency and the luminance of exiting light, the vertical prism may be configured so that the rays of light may travel straight in the direction substantially perpendicular to the light entering surface.

If positions of the light sources relative to the light entering surface of the light guide plate are not constant, an amount of light exiting from the light source farther from the light entering surface in comparison to other light sources and entering the light entering surface may be less. This may cause a dark stripe extending in the direction perpendicular to the light entering surface.

The straightness of traveling directions of the rays of light achieved through the vertical prism may be reduced so that the dark stripe is less likely to be recognized. However, when the straightness is reduced, the rays of light are more likely to be diffused relative to the direction parallel to the light entering surface. As a result, the rays of light exiting from the different light sources and entering the light entering surface may overlap each other near the light entering surface. This may cause a local bright area.

SUMMARY

The technology described herein was made in view of the above circumstances. An object is to improve luminance uniformity.

A lighting device includes light sources and a light guide plate. The light guide plate guides rays of light. The light guide plate includes a base portion and a light collecting portion. The base portion has a plate shape. The base portion includes a light entering surface through which light enters the base portion and a light exiting surface through which the light exits the base portion. The light entering surface is at least one of side surfaces of the base portion. The light exiting surface is one of plate surfaces of the base portion.

The light collecting portion protrudes from the light exiting surface. The light collecting portion includes light collecting sections elongated in a first direction parallel to a normal direction to the light entering surface and arranged in a second direction perpendicular to the first direction. The light collecting sections perform linearity adjustment to the rays of light so that the rays of light travel along the first direction. The light collecting sections include first light collecting regions and second light collecting regions.

The second light collecting regions are adjacent to the light entering surface than the first light collecting regions. The second light collecting regions perform the linearity adjustment at a degree greater than a degree of the linearity adjustment performed by the first light collecting regions. The light sources are arranged in the second direction and opposed to the light entering surface.

A display device includes the lighting device described above and a display panel that displays images using light from the lighting device.

A lighting device includes light sources and a light guide plate. The light guide plate guides rays of light. The light guide plate includes a base portion and a light collecting portion. The base portion has a plate shape. The base portion includes a light entering surface through which light enters the base portion and a light exiting surface through which the light exits the base portion. The light entering surface is at least one of side surfaces of the base portion. The light exiting surface is one of plate surfaces of the base portion.

The light collecting portion protrudes from the opposite plate surface. The light collecting portion includes light collecting sections elongated in a first direction parallel to a normal direction to the light entering surface and arranged in a second direction perpendicular to the first direction. The light collecting sections perform linearity adjustment to the rays of light so that the rays of light travel along the first direction. The light collecting sections include first light collecting regions and second light collecting regions.

The second light collecting regions are adjacent to the light entering surface than the first light collecting regions. The second light collecting regions perform the linearity adjustment at a degree greater than a degree of the linearity adjustment performed by the first light collecting regions. The light sources are arranged in the second direction and opposed to the light entering surface.

According to the technology described herein, uniformity in luminance of exiting light improves.

BRIEF DESCRIPTION OF THE DRAWINGS

FIG. 20 is a table presenting results of comparative experiment 1 regarding comparative examples 1 and 2 and embodiment 1.

FIG. 21 is a table presenting results of comparative experiment 2 regarding comparative examples 1 and 2 and embodiment 1.

DETAILED DESCRIPTION

First Embodiment

Figure 1:
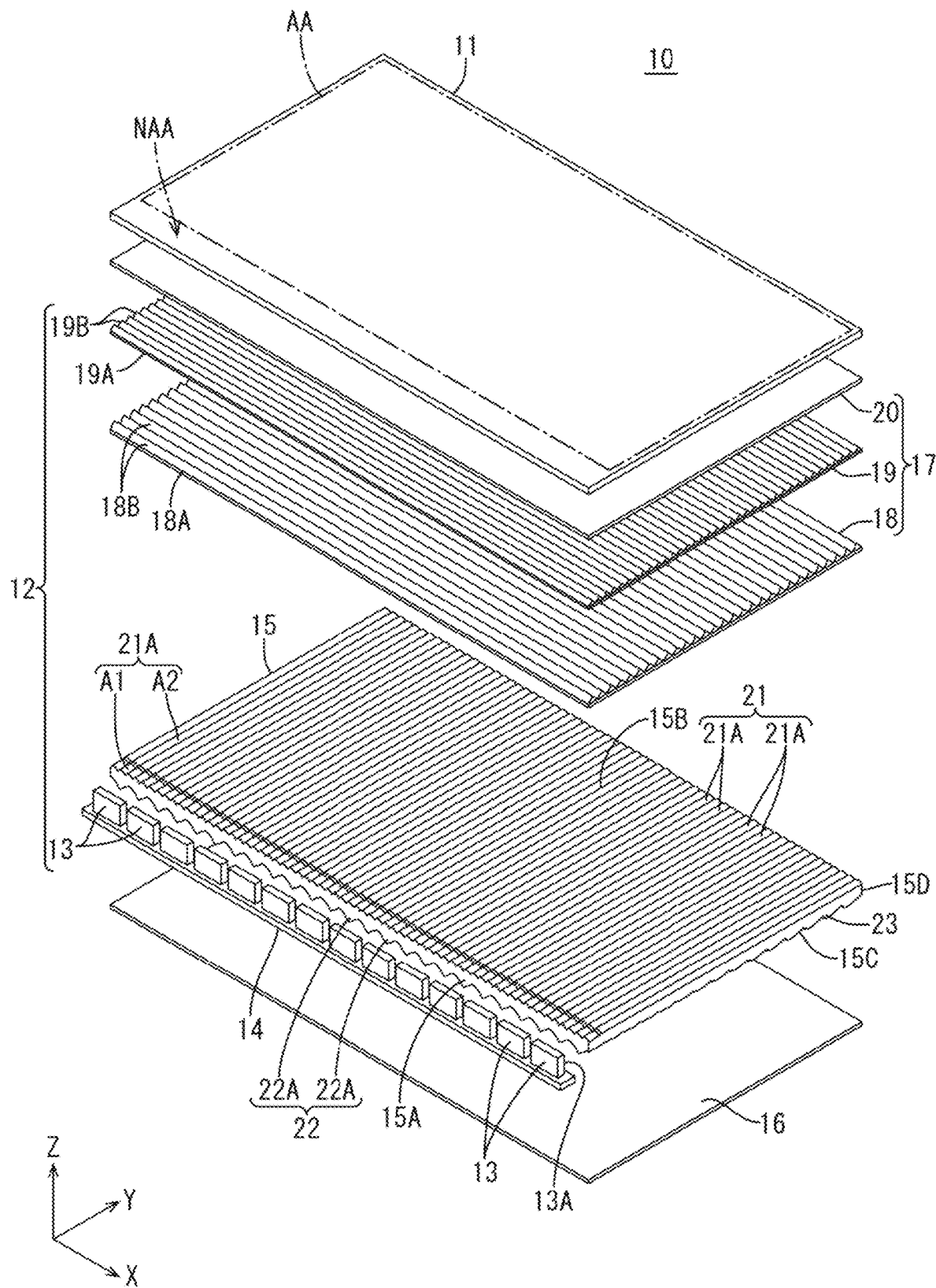
FIG. 1 is an exploded perspective view of a liquid crystal display device.

A liquid crystal display device 10 (a display device) will be described with reference to FIGS. 1 to 21. X-axes, Y-axes, and Z-axes may be present in the drawings. The axes in each drawing indicate directions that correspond to directions indicated by the respective axes in other drawings. A vertical direction is defined based on FIGS. 2, 3, 8, 9 and 10. An upper side and a lower side in FIGS. 2, 3, 8, 9 and 10 correspond to a front side and a back side of the liquid crystal display device 10, respectively.

As illustrated in FIG. 1, the liquid crystal display device 10 includes a liquid crystal panel 11 (a display panel) and a backlight 12 (a lighting device). The liquid crystal panel 11 displays images. The backlight 12 is disposed behind the liquid crystal panel to apply light to the liquid crystal panel 11 for display. The liquid crystal panel 11 has a rectangular plate shape. The liquid crystal panel 11 is oriented such that long edges and short edges of the liquid crystal panel 11 extend in the X-axis direction and the Y-axis direction, respectively. The liquid crystal panel 11 has a thickness measuring in the Z-axis direction.

The liquid crystal panel 11 includes a CF substrate (a common substrate), an array substrate (a TFT substrate), and a liquid crystal layer sealed between the CF substrate and the array substrate.

The CF substrate is disposed on the front side. The array substrate is disposed on the back side. The CF substrate includes color filters, a light blocking portion (a black matrix), and an alignment film. The color filters include red (R), green (G), and blue (B) color portions that are arranged in a predefined pattern. The light blocking portion is disposed among the R, the G, and the B color portions to be separated the adjacent color portions.

The array substrate includes switching components (e.g., TFTs), pixel electrodes, and an alignment film. The switching components are connected to source lines and gate lines that are perpendicular to each other. The pixel electrodes are connected to the switching components.

The liquid crystal panel 11 includes a display area AA and a non-display area NAA. The display area AA corresponds to an inner area of a plate surface of the liquid crystal panel 11. The images are displayed in the display area AA. The non-display area NAA corresponds to an outer area of the plate surface of the liquid crystal panel 11 surrounding the display area AA to form a frame shape. An outline of the display area AA is indicated by a dash-dot line in FIG. 1.

A reflective polarizing sheet 20 is attached to a back plate surface (an outer surface) of the array substrate. The reflective polarizing sheet 20 is included in the backlight 12. The reflective polarizing sheet 20 will be described in detail later. A polarizing plate is attached to a front plate surface (an outer surface) of the CF substrate.

The backlight 12 will be described. As illustrated in FIG. 1, the backlight 12 includes LEDs 13 (a light source), an LED substrate 14 (a light source substrate), a light guide plate 15, a reflective sheet 16, and an optical sheet component 17. The LEDs 13 are mounted on the LED substrate 14. The light guide plate 15 guides light from the LEDs 13. The reflective sheet 16 is disposed behind the light guide plate 15. The optical sheet component 17 is disposed between the light guide plate 15 and the liquid crystal panel 11. The backlight 12 is an edge-lit type backlight in which the light from the LEDs 13 enters the light guide plate 15 through only one of side surfaces of the light guide plate 15.

Each of the LEDs 13 includes an LED chip and a substrate. The substrate is bonded to the LED substrate 14. The chip is disposed on the substrate and sealed with a sealant. The LED chip emits a single color of blue light. The sealant includes phosphor particles dispersed in the sealant. The LED 13 emits white light. The phosphor particles include yellow phosphor particles, green phosphor particles, and red phosphor particles. The LEDs 13 include mounting surfaces mounted to the LED substrate 14 and light emitting surfaces 13A adjacent to the mounting surfaces. The LEDs 13 are side emitting LEDs. The LED substrate 14 is disposed parallel to the light guide plate 15. The plate surface of the LED substrate 14 on the back side is defined as a mounting surface on which the LEDs 13 are mounted. The LEDs 13 are arranged at intervals in the X-axis direction (a second direction) on the mounting surface.

The light guide plate 15 is made of a transparent synthetic resin material having a refractive index sufficiently greater than that of the air (e.g., an acrylic resin such as PMMA). As illustrate in FIG. 1, the light guide plate 15 includes a base portion that has a plate shape. The base portion is parallel to and opposite the liquid crystal panel 11. The light guide plate 15 is oriented with long edges and short edges of the base portion extending in the X-axis direction and the Y-axis direction, respectively. The thickness of the light guide plate 15 measures in the Z-axis direction.

The light guide plate 15 is between the liquid crystal panel 11 and the optical sheet component 17. One of side surfaces of the base portion of the light guide plate 15 along the long edges of the base portion opposite the light emitting surfaces 13A of the LEDs 13 is defined as a light entering surface 15A through which the light emitted through the light emitting surfaces 13A enters the light guide plate 15. The light entering surface 15A has an elongated shape that extends in the X-axis direction to be opposed to all LEDs 13.

One of plate surfaces of the base portion of the light guide plate 15 on the front side is defined as a light exiting surface 15B. The other one of the plate surfaces of the base portion of the light guide plate 15 on the back side is defined as an opposite plate surface 15C. The light exiting surface 15B is opposed to the liquid crystal panel 11 and the optical sheet component 17. The opposite plate surface 15C is opposed to the reflective sheet 16.

The light guide plate 15 receives the light emitted by the LEDs 13 toward the light guide plate 15 through the light entering surface 15A and guides the light toward the light exiting surface 15B. The other one of the side surfaces of the base portion of the light guide plate 15 opposite the light entering surface 15A is defined as an opposite side surface 15D.

A normal direction to the light entering surface 15A or the opposite side surface 15D matches the Y-axis direction (the first direction). A direction perpendicular to the normal direction and parallel to long edges of the light entering surface 15A matches the X-axis direction. The normal direction to the light entering surface 15A is parallel to a direction in which the LEDs 13 are separated from the light guide plate 15 and an optical axis of each LED 13 (a light travel direction with the highest luminous intensity). The structure of the light guide plate 15 will be described in detail later.

As illustrated in FIG. 1, the reflective sheet 16 includes plate surfaces parallel to the plate surfaces of the liquid crystal panel 11 and the light guide plate 15. The reflective sheet 16 is disposed to cover the opposite plate surface 15C of the light guide plate 15. The reflective sheet 16 has high light reflectivity. The reflective sheet 16 reflects some rays of light exiting through the opposite plate surface 15C toward the light exiting surface 15B. The reflective sheet 16 has an area larger than the opposite plate surface 15C to cover an entire area of the opposite plate surface 15C. Therefore, the rays of light are properly directed toward the light exiting surface 15B to exit the base portion of the light guide plate 15 through the light exiting surface 15B.

As illustrated in FIG. 1, the optical sheet component 17 has a rectangular sheet shape. The optical sheet component 17 includes plate surfaces parallel to the plate surfaces of the liquid crystal panel 11 and the light guide plate 15. The plate surfaces of the optical sheet component 17 include long edges that extend in the X-axis direction and short edges that extend in the Y-axis direction. The optical sheet component 17 has a thickness that measures in the Z-axis direction.

The optical sheet component 17 is disposed between the liquid crystal panel 11 and the light guide plate 15 with respect to the Z-axis direction. The optical sheet component 17 exerts optical effects on the light emitted by the LEDs 13 and directs the light toward the liquid crystal panel 11. The plate surface of the optical sheet component 17 on the back side opposite the light guide plate 15 is defined as a light entering surface. The plate surface of the optical sheet component 17 on the front side opposite the liquid crystal panel 11 is defined as a light exiting surface. The optical sheet component 17 includes a first prism sheet 18, a second prism sheet 19, and the reflective polarizing sheet 20 layered in this sequence from the back side.

The reflective polarizing sheet 20 will be described. The reflective polarizing sheet 20 includes a polarizing film, a multilayer film, and a protective film. The polarizing film has a specified polarization axis (a transmission axis). The polarizing film includes a polarizer and protective films that sandwich the polarizer. The polarizer is prepared by adding absorbers (e.g., iodine, dichroic dye) to a polymer resin film (e.g., a polyvinyl alcohol (PVA) film) and uniaxially stretching the polymer resin film to orient the absorbers. The protective film may be a triacetyl cellulose (TAC) film. The polarizing film has the polarization axis and an absorption axis that is perpendicular to the polarization axis.

According to the configuration, the polarizing film exclusively passes light waves of linear polarization parallel to the polarization axis and convers light waves of circular polarization into light waves of linear polarization parallel to the polarization axis. The polarization axis of the polarizing film is perpendicular to a polarization axis of the polarizing plate attached to the outer plate surface of the CF substrate.

The multilayer film includes layers having different refractive indexes and being alternately disposed. The layers are made of polyethylene naphthalate (PEN). Because of the multilayer structure, the multilayer film exhibits different reflective characteristics (light transmission characteristics) between P waves and S waves included in the light. The multilayer film has a light reflectivity for the S waves greater than a light reflectivity for the P waves.

The S waves reflected by the multilayer film may be reflected by the light guide plate 15, the reflective sheet 16, or other sheets of the optical sheet component 17 and separated from the P waves. The reflective polarizing sheet 20 reflects the S waves, which may be absorbed by the polarizing film without the multilayer film, toward the back side. According to the configuration, the light use efficiency improves and thus the luminance increases.

Figure 2:
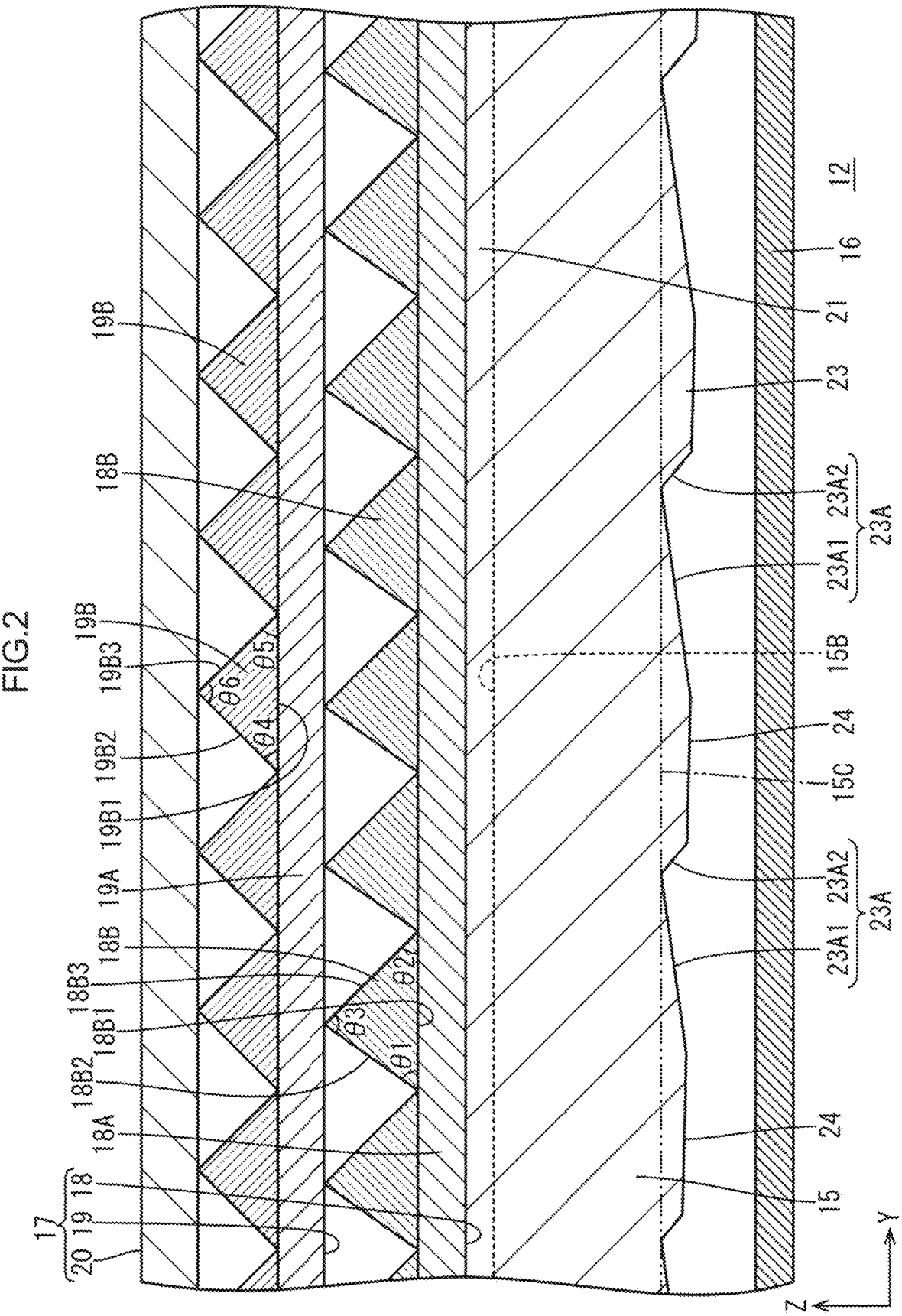
FIG. 2 is a cross-sectional view of a backlight including in the liquid crystal device cut in a Y-axis direction.

As illustrated in FIGS. 1 and 2, the first prism sheet 18 includes a first base 18A and first prisms 18B. The first base 18A has a sheet shape and includes a front plate surface on the light exiting side and a back plate surface opposite the front plate surface.

The first base 18A is made of a transparent synthetic resin material, which may be a crystalline transparent resin material such as a polyethylene terephthalate (PET) material. The first base 18A is prepared by stretching the crystalline transparent resin material into the sheet shape through biaxial stretching. This process is preferable for reducing a production cost. The first prisms 18B are disposed on the front plate surface of the first base 18A. The first prisms 18B are made of a transparent ultraviolet curable resin material, which is one kind of light curable resin materials.

In a production process of the first prism sheet 18, an ultraviolet curable resin material is filled in a mold, the first base 18A is placed against opening edges of the mold such that a surface of the ultraviolet curable resin material contact the first base 18A, and ultraviolet rays are applied to the ultraviolet curable resin material through the first base 18A until the ultraviolet curable resin material is cured. Through the process, the first base 18A and the first prisms 18B are integrated into a single piece. The ultraviolet curable resin material for the first prisms 18B may include an acrylic resin such as PMMA. The ultraviolet curable resin material for the first prisms 18B may have a refractive index in a range from 1.49 to 1.52, preferably 1.49.

The first prisms 18B project from the plate surface of the first base 18A in the Z-axis direction toward the front side opposite the light guide plate 15. Each first prism 18B has a triangular cross section along the Y-Z plane. The first prisms 18B linearly extend in the X-axis direction (the second direction). The first prisms 18B are arranged in the Y-axis direction (the first direction) on the plate surface of the first base 18A without gaps between the adjacent first prisms 18B.

The first prisms 18B include three surfaces. The surfaces each having a width in the Y-axis direction and being parallel to the plate surface of the first base 18A may be referred to as base surfaces 18B1. The surfaces extend from sides of the base surfaces 18B1 adjacent to the LEDs 13 with respect to the Y-axis direction may be referred to as first inclined surfaces 18B2. The surfaces extend from sides of the base surfaces 18B1 farther from the LEDs 13 may be referred to as second inclined surfaces 18B3. The first inclined surfaces 18B2 and the respective second inclined surfaces 18B3 incline toward each other.

The second inclined surfaces 18B3 refract rays of light entering the first prisms 18B and traveling away from the LEDs 13 with respect to the Y-axis direction. The first inclined surfaces 18B2 refract rays of light entering the first prism 18B and traveling toward the LEDs 13 with respect to the Y-axis direction. A majority of the rays of light refracted by the first inclined surfaces 18B2 and the second inclined surfaces 18B3 are collected with respect to the Y-axis direction.

As illustrated in FIGS. 1 and 2, a first angle $\theta 1$ between the base surface 18B1 and the first inclined surface 18B2 of each first prism 18B is greater than a second angle $\theta 2$ between the base surface 18B1 and the second inclined surface 18B3 of each first prism 18B. That is, the cross section of each first prism 18B is an inequilateral triangle. The first angle $\theta 1$ between the base surface 18B1 and the first inclined surface 18B2 may be in a range from 50° to 60°, preferably 55°. The second angle $\theta 2$ between the base surface 18B1 and the second inclined surface 18B3 may be in a range from 35° to 50°, preferably 45°. A third angle $\theta 3$ between the first inclined surface 18B2 and the second inclined surface 18B3 (a vertex angle of the cross section) may be in a range from 70° to 95°, preferably 80°.

Heights of the first prisms 18B (dimensions between the base surfaces 18B1 and the vertexes) are equal to each other. The first prisms 18B are identical with each other, that is, the first prisms 18B have the dimensions (the heights, the widths, the angles of the inclined surfaces 18B2 and 18B3 relative to the base surfaces 18B1) described above. The first prisms 18B are arranged at constant intervals.

As illustrated in FIGS. 1 and 2, the second prism sheet 19 includes a second base 19A and second prisms 19B. The second base 19A has a sheet shape and includes a front plate surface on the light exiting side and a back plate surface opposite the front plate surface. The second base 19A is made of a transparent synthetic resin material, which may be a crystalline transparent resin material such as a PET material.

The second base 19A is prepared through the same process as the first base 18A. The second prisms 19B are disposed on the front plate surface of the second base 19A. The ultraviolet curable resin material for the second prisms 19B may include an acrylic resin such as PMMA. The ultraviolet curable resin material for the second prisms 19B may have a refractive index greater than the refractive index of the ultraviolet curable resin material for the first prisms 18B, for instance 1.61.

The second prisms 19B project from the plate surface of the second base 19A in the Z-axis direction toward the front side opposite the first prism sheet 18. Each second prism 19B has a triangular cross section along the Y-Z plane. The second prisms 19B linearly extend in the X-axis direction. The second prisms 19B are arranged in the Y-axis direction on the plate surface of the second base 19A without gaps between the adjacent second prisms 19B.

The second prisms 19B include three surfaces. The surfaces each having a width in the Y-axis direction and being parallel to the plate surface of the second base 19A may be referred to as base surfaces 19B1. The surfaces extend from sides of the base surfaces 19B1 closer to the LEDs 13 with respect to the Y-axis direction may be referred to as first inclined surfaces 19B2. The surfaces extend from sides of the base surfaces 19B1 farther from the LEDs 13 may be referred to as second inclined surfaces 19B3. The first inclined surfaces 19B2 and the respective second inclined surfaces 19B3 incline toward each other.

The second inclined surfaces 19B3 refract rays of light entering the second prisms 19B and traveling away from the LEDs 13 with respect to the Y-axis direction. The first inclined surfaces 19B2 refract rays of light entering the second prism 19B and traveling toward the LEDs 13 with respect to the Y-axis direction. A majority of the rays of light refracted by the first inclined surfaces 19B2 and the second inclined surfaces 19B3 are collected with respect to the Y-axis direction.

As illustrated in FIGS. 1 and 2, a fourth angle $\theta 4$ between the base surface 19B1 and the first inclined surface 19B2 of each second prism 19B is equal to a fifth angle $\theta 5$ between the base surface 19B1 and the second inclined surface 19B3 of each second prism 19B. That is, the cross section of each second prism 19B is an isosceles triangle. The fourth angle $\theta 4$ between the base surface 19B1 and the first inclined surface 19B2 is less than the first angle $\theta 1$ between the base surface 18B1 and the first inclined surface 18B2.

The fourth angle $\theta 4$ between the base surface 19B1 and the first inclined surface 19B2 and the fifth angle $\theta 5$ between the base surface 19B1 and the second inclined surface 19B3 may be in a range from 40° to 50°, preferably 45°. A sixth angle $\theta 6$ between the first inclined surface 19B2 and the second inclined surface 19B3 (a vertex angle of the cross section) may be in a range from 80° to 100°, preferably 90°.

Heights of the second prisms 19B (dimensions between the base surfaces 19B1 and the vertexes) are equal to each other. The second prisms 19B are identical with each other, that is, the second prisms 19B have the dimensions (the heights, the widths, the angles of the inclined surfaces 19B2 and 19B3 relative to the base surfaces 19B1) described above. The second prisms 19B are arranged at constant intervals. To reduce moire stripes, the height and the intervals of the second prisms 19B may be different from the height and the intervals of the first prisms 18B.

Figure 3:
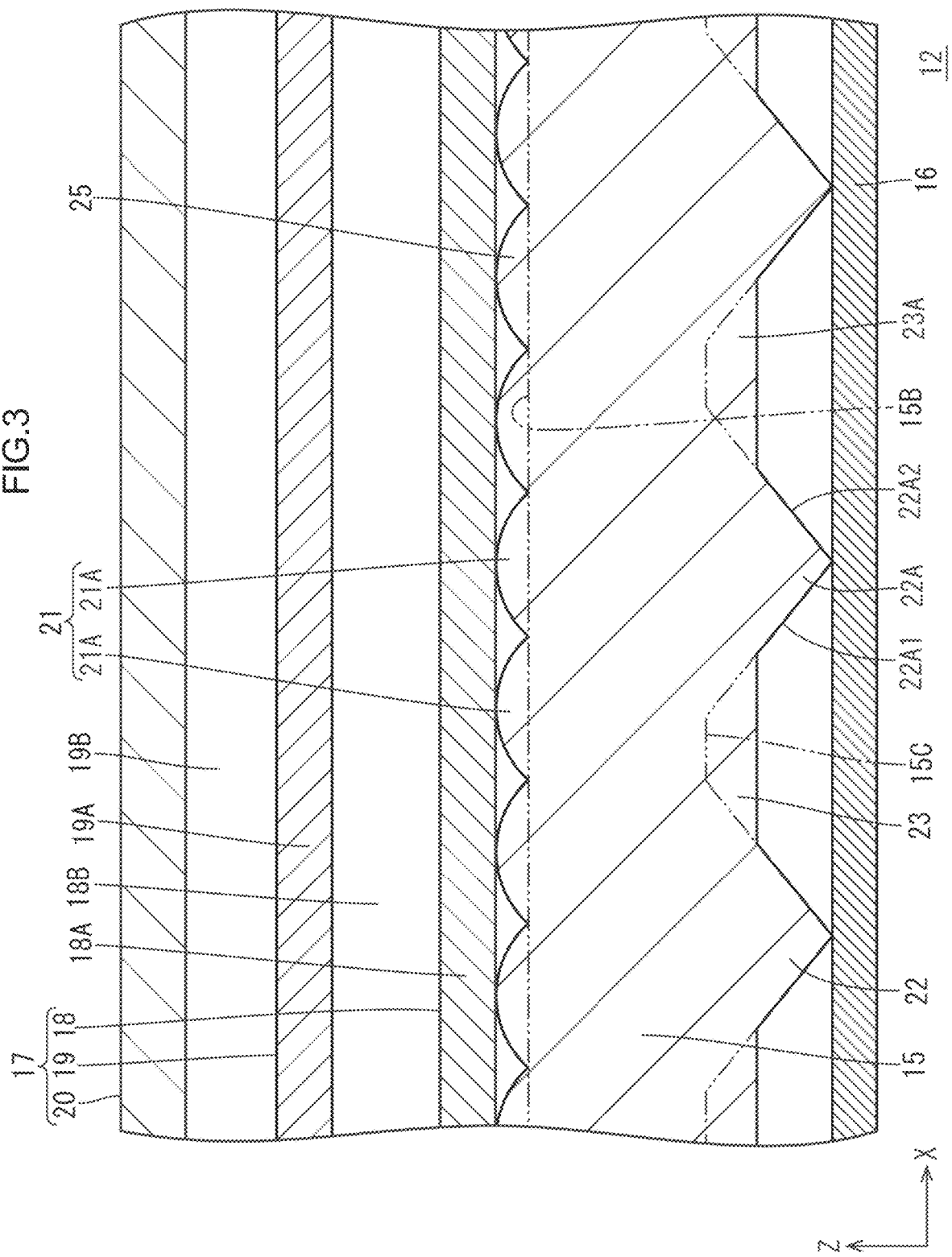
FIG. 3 is a cross-sectional view of the backlight cut in an X-axis direction.

The configuration of the light guide plate 15 will be described in detail. As illustrated in FIGS. 1 and 3, the light guide plate 15 includes a first lens portion 21 and a second lens portion 22. The first lens portion 21 protrudes from the light exiting surface 15B. The second lens portion 22 protrudes from the opposite plate surface 15C.

The first lens portion 21 includes first lens sections 21A (first light collecting sections) that extend in the Y-axis direction. The first lens sections 21A are arranged in the X-axis direction on the light exiting surface 15B of the light guide plate 15. The first lens portion 21 is a lenticular lens. The first lens portion 21 is prepared using a mold to form the light guide plate 15. The mold includes a section to form the light exiting surface 15B of the light guide plate 15. The section of the mold includes an inverted pattern of the pattern of the first lens portion 21 on the light exiting surface 15B. The first lens portion 21 will be described in detail later.

As illustrated in FIGS. 1 and 3, the second lens portion 22 on the opposite plate surface 15C of the light guide plate 15 includes second lens sections 22A (second light collecting sections) that extend in the Y-axis direction. The second lens sections 22A are arranged in the X-axis direction. The second lens sections 22A exclusively include prisms that protrude toward the back side. The prisms linearly extend in the Y-axis direction. Each prism has a triangular cross section along the X-axis direction.

Each second lens section 22A has a width in the X-axis direction (the second direction). The width is constant for an entire length that measures in the Y-axis direction (the first direction). The cross section of each second lens section 22A is an isosceles triangle. The second lens sections 22A have inclined surfaces 22A1 and 22A2. A vertex angle defined by the inclined surfaces 22A1 and 22A2 of each second lens section 22A may be in a range from 100° to 150°, preferably 140°. The second lens sections 22A are identical with each other, that is, the second lens sections 22A have the same dimensions (vertex angles, widths of base surfaces, heights).

The second lens sections 22A are arranged at constant intervals. The intervals of the second lens sections 22A are greater than the intervals of the first lens sections 21A. The second lens portion 22 is prepared using the mold to form the light guide plate 15. The mold includes a section to form the opposite plate surface 15C of the light guide plate 15. The section of the mold includes an inverted pattern of the pattern of the second lens portion 22 on the opposite plate surface 15C.

According to the configuration described above, the rays of light traveling inside the light guide plate 15 are repeatedly refracted by curved surfaces of the first lens sections 21A on the light exiting surface 15B, that is, the rays of light travel along the Y-axis direction as a whole. Namely, linearity of the rays of light is achieved through the first lens portion 21. The rays of light in the light guide plate 15 are repeatedly refracted by the inclined surfaces 22A1 and 22A2 of the second lens sections 22A on the opposite plate surface 15C, that is, the rays of light travel along the Y-axis direction as a whole. Namely, linearity of the rays of light is achieved through the second lens portion 22. According to the configuration, the light use efficiency improves and the luminance of the light exiting through the light exiting surface 15B increases.

As illustrated in FIGS. 1 and 2, the light guide plate 15 includes light reflecting portions 23 that protrude from the opposite plate surface 15C. The light reflecting portions 23 include reflecting sections 23A arranged at intervals in the Y-axis direction. The reflecting sections 23A protrude in the Z-axis direction toward the back side. Each reflecting section 23A has a triangular cross section along the Y-Z plane.

The reflecting sections 23A include first reflecting surfaces 23A1 and second reflecting surfaces 23A2. The first reflecting surfaces 23A1 are closer to the LEDs 13 than the corresponding second reflecting surfaces 23A2 and angled relative to the X-Y plane. The second reflecting surfaces 23A2 are opposite the corresponding first reflecting surfaces 23A1 and angled relative to the X-Y plane.

The first reflecting surfaces 23A1 and the second reflecting surfaces 23A2 reflect the rays of light traveling through the light guide plate 15 to change travel directions of the rays of light closer to the Z-axis direction so that the rays of light exit through the light exiting surface 15B. Specifically, the first reflecting surfaces 23A1 reflect the rays of light traveling farther from the LEDs 13 with respect to the Y-axis direction and the second reflecting surfaces 23A2 reflect the rays of light traveling toward the LEDs 13.

The first reflecting surfaces 23A1 are angled relative to the X-Y plane such that edges of the first reflecting surfaces 23A1 closer to the LEDs 13 are farther from the light exiting surface 15B in comparison to edges of the first reflecting surfaces 23A1 farther from the LEDs 13. The angle of each first reflecting surface 23A1 relative to the X-Y plane is about 8°.

The second reflecting surfaces 23A2 are angled relative to the X-Y plane such that edges of the second reflecting surfaces 23A2 closer to the LEDs 13 are closer to the light exiting surface 15B in comparison to edges of the second reflecting surfaces 23A2 farther from the LEDs 13. Namely, the first reflecting surfaces 23A1 and the second reflecting surfaces 23A2 are inclined in opposite directions. The angle of each second reflecting surface 23A2 relative to the X-Y plane is about 40° (an angle of each second reflecting surface 23A2 relative to the X-Z plane is about 50°). The angle of each second reflecting surface 23A2 relative to the X-Y plane is greater than the angle of each first reflecting surface 23A1 relative to the X-Y plane.

The reflecting sections 23A have different heights measuring in the Z-axis direction. The greater the distance of the reflecting sections 23A from the LEDs 13 in the Y-axis direction, the greater the height. The reflecting sections 23A have different lengths measuring in the Y-axis direction. The greater the distance of the reflecting sections 23A from the LEDs 13 in the Y-axis direction, the greater the length. Namely, the reflecting section 23A closer to the LEDs 13 in the Y-axis direction has areas of the first reflecting surfaces 23A1 and the second reflecting surface 23A2 greater than areas of the first reflecting surfaces 23A1 and the second reflecting surface 23A2 of the reflecting section 23A farther from the LEDs 13 in the Y-axis direction.

According to the configuration, the rays of light are less likely to be reflected by the reflecting surfaces 23A1 and 23A2 of the reflecting sections 23A closer to the LEDs 13 in the Y-axis direction but the rays of light are more likely to be reflected by the reflecting surfaces 23A1 and 23A2 of the reflecting sections 23A farther from the LEDs 13 in the Y-axis direction. Therefore, the emission of light is reduced in areas of the light exiting surface 15B closer to the LEDs 13 and increased in areas of the light exiting surface 15B farther from the LEDs 13. Namely, amounts of light exiting through the areas of the light exiting surface 15B closer to the LEDs 13 in the Y-axis direction and amounts of the light exiting through the areas of the light exiting surface 15B farther from the LEDs 13 in the Y-axis direction are equalized.

As illustrated in FIGS. 1 and 2, the light guide plate 15 includes inclined portions 24 that protrude from the opposite plate surface 15C and include inclined surfaces. The inclined portions 24 are adjacent to the reflecting sections 23A in the Y-axis direction. The reflecting sections 23A and the inclined portions 24 are alternately arranged in the Y-axis direction.

The inclined surface of each inclined portion 24 continues from the second reflecting surface 23A2 of the adjacent reflecting section 23A closer to the LEDs 13 than the inclined surface of the inclined portion 24 in the Y-axis direction to the first reflecting surface 23A1 of the adjacent reflecting section 23A farther from the LEDs 13 than the inclined surface of the inclined portion 24 in the Y-axis direction. The inclined surfaces of the inclined portions 24 are inclined toward the opposite plate surface 15C such that a distance from the light exiting surface 15B increases as a distance from the LEDs 13 increases. The inclined surfaces are inclined in the same direction as the second reflecting surfaces 23A2 of the reflecting sections 23A. An angle of the inclined surface of each inclined portion 24 relative to the X-Y plane is about 1.4°, that is smaller than the angles of the reflecting surfaces 23A1 and 23A2 of the reflecting sections 23A relative to the X-Y plane.

According to the configuration, the inclined surfaces of the inclined portions 24 reflect the rays of light traveling away from the LEDs 13 in the light guide plate 15 toward the light exiting surface 15B. Angles of incident rays of light on the light exiting surface 15B do not exceed the critical angle and thus the rays of light are totally reflected by the light exiting surface 15B and directed away from the LEDs 13. According to the configuration, the rays of light exiting through the light exiting surface 15B are less likely to be concentrated in the areas closer to the LEDs 13 in the Y-axis direction.

The angles of the inclined surfaces of the inclined portions 24, the first reflecting surfaces 23A1, and the second reflecting surfaces 23A2 increases in this sequence. The greater the distance of the inclined portions 24 from the LEDs 13 in the Y-axis direction, the greater the length of the inclined portions 24. This is because the greater the distance of the reflecting sections 23A in the Y-axis direction, the greater the length of the reflecting sections 23A and thus the area of the reflecting sections 23A increases.

Figure 4:
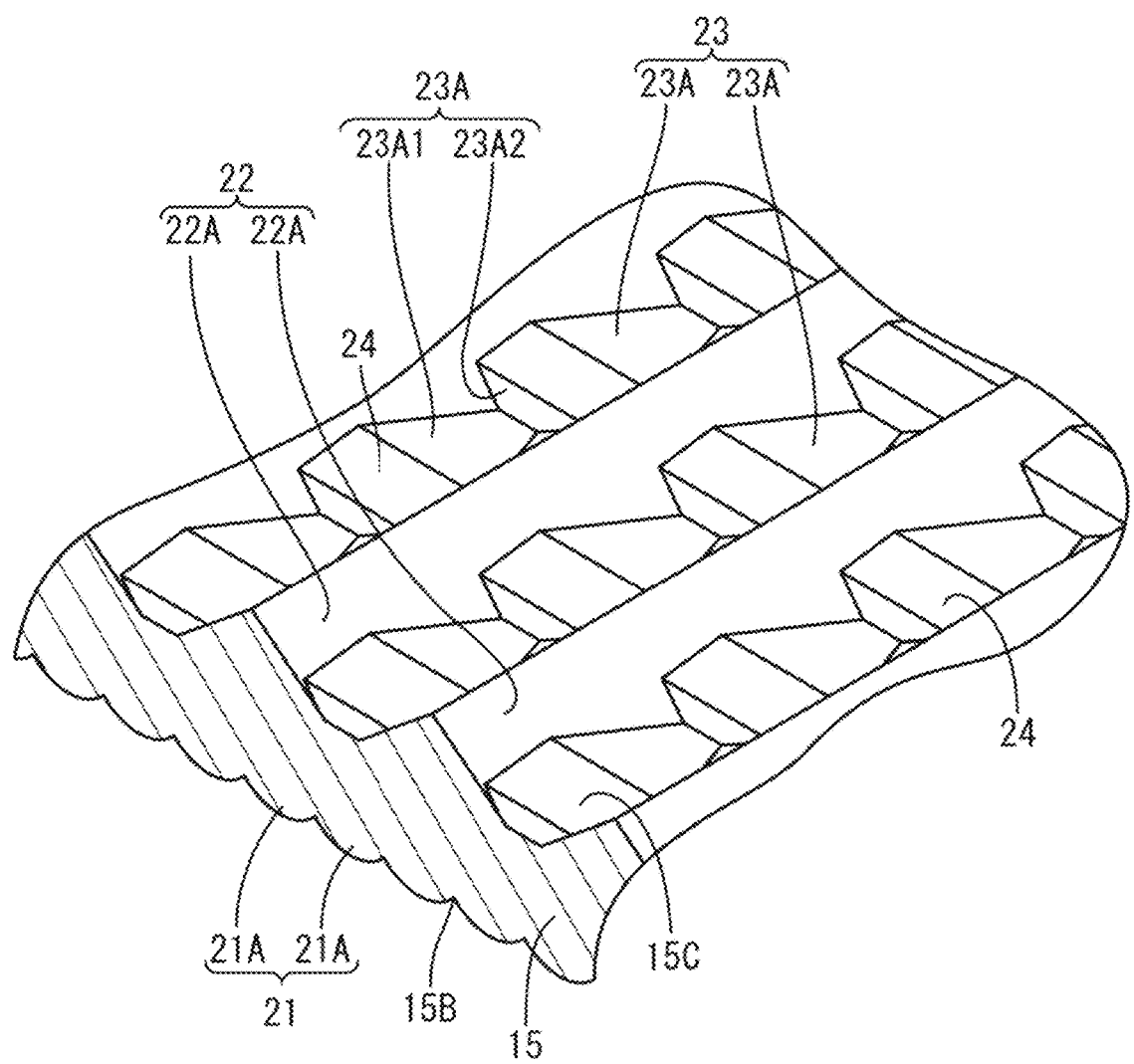
FIG. 4 is a perspective view of a light guide plate included in the backlight.
Figure 5:
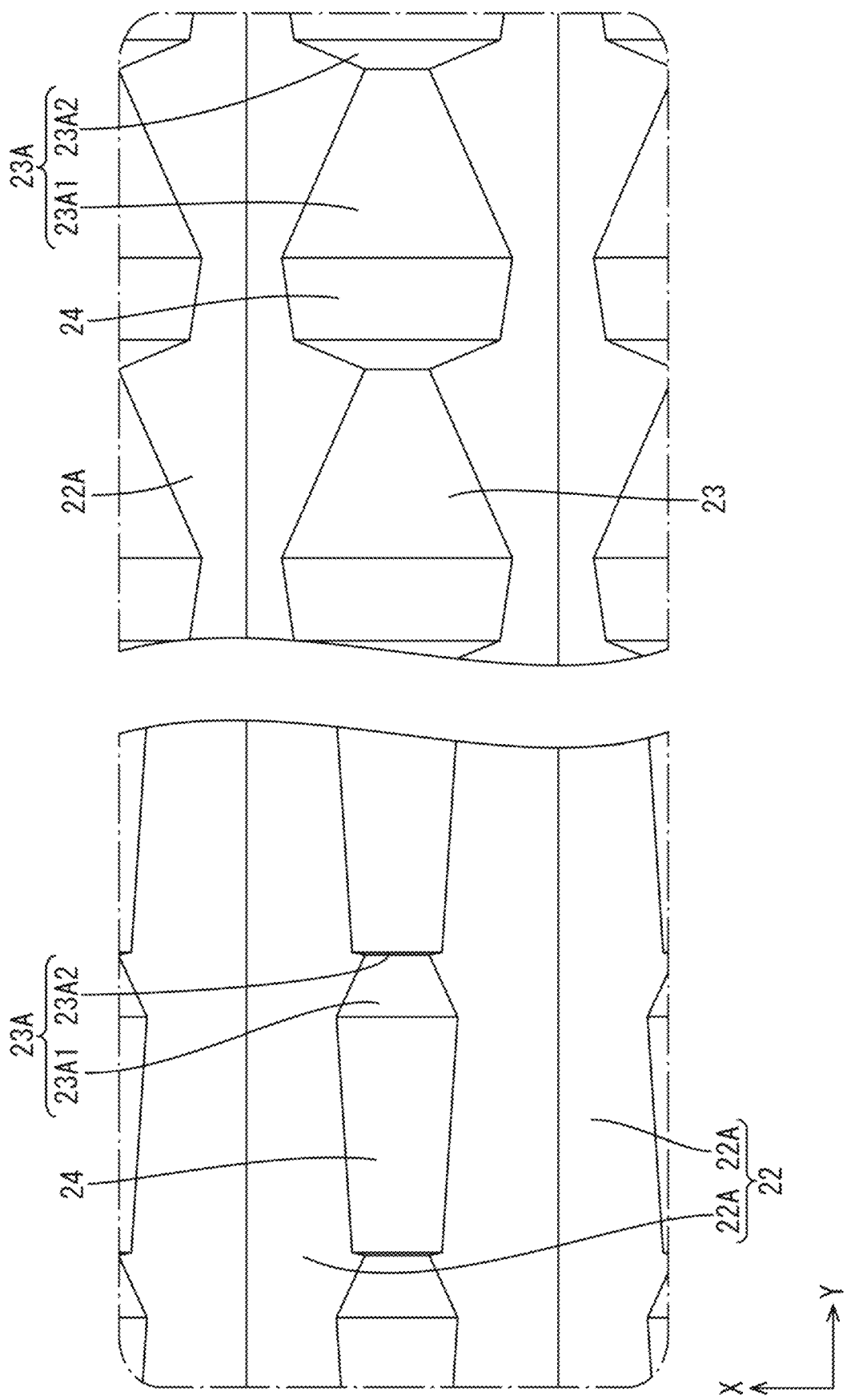
FIG. 5 is a back view of the light guide plate.

As illustrated in FIGS. 3 to 5, the light reflecting portions 23 and the inclined portions 24 are sandwiched between the adjacent second lens sections 22A in the X-axis direction. The light reflecting portions 23 and the inclined portions 24 and the second lens sections 22A are alternately arranged in the X-axis direction. Each reflecting section 23A has a maximum dimension perpendicular to the opposite plate surface 15C (a height) less than the height of each second lens section 22A. Therefore, the reflecting sections 23A at the farthest from the LEDs 13 does not project farther to the back side than the second lens sections 22A.

Figure 6:
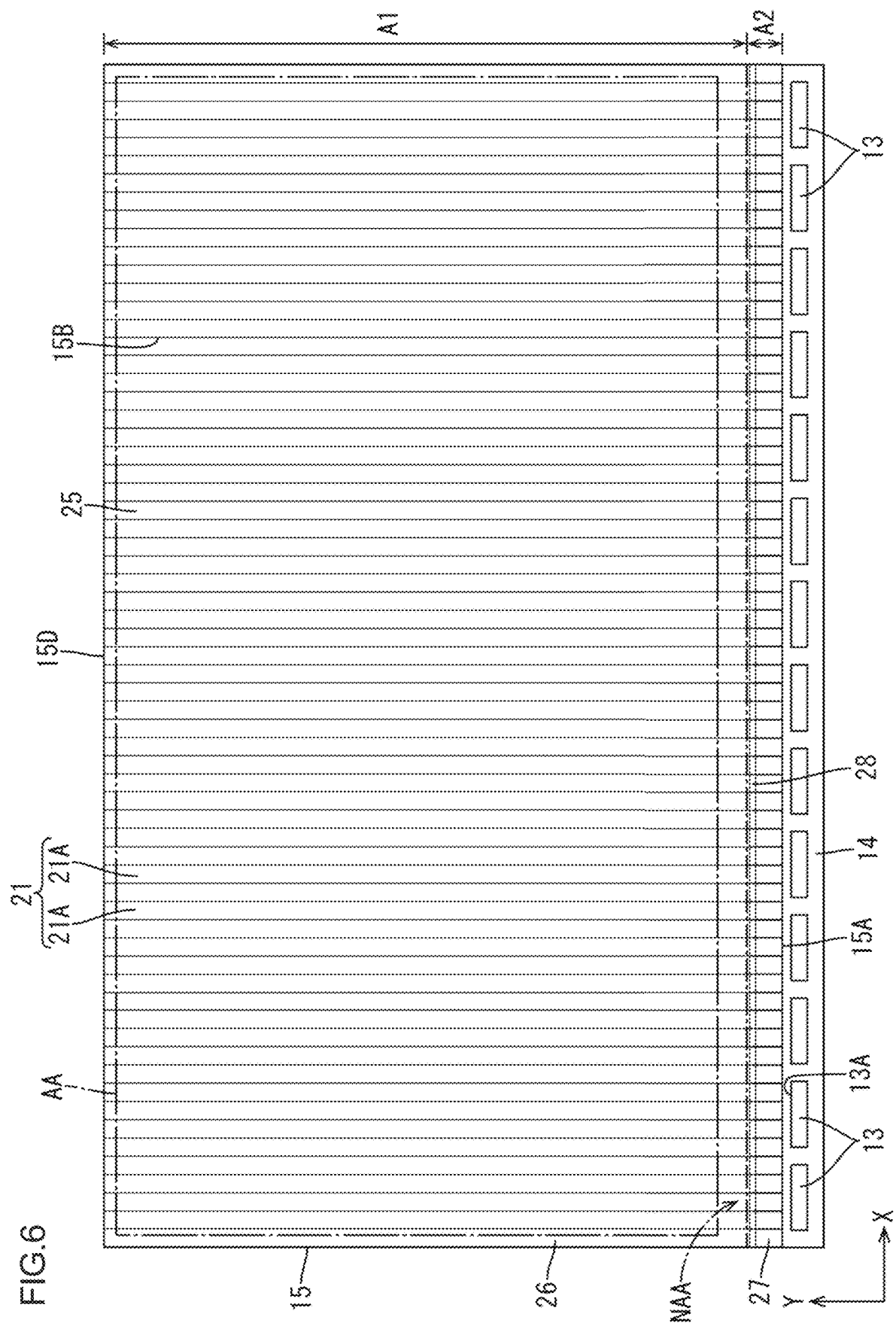
FIG. 6 is a plan view of the backlight including LEDS, an LED substrate, and the light guide plate.

The first lens sections 21A included in the first lens portion 21 will be described in detail. As illustrated in FIG. 6, the first lens sections 21A include first light collecting regions A1 and second light collecting regions A. The second light collecting regions A2 are adjacent to the LEDs 13 in the Y-axis direction (adjacent to the light entering surface 15A). The first light collecting regions A1 are farther from the LEDs 13 relative to the second light collecting regions A2 in the Y-axis direction (adjacent to the opposite side surface 15D).

The first lens sections 21A perform linearity adjustments to the rays of light in the light guide plate 15 at different degrees in the first light collecting regions A1 and the second light collecting regions A2. In the first light collecting regions A1, traveling directions of the rays of light are adjusted closer to the Y-axis direction at a less degree in comparison to the second light collecting regions A2. Traveling directions of the rays of light are adjusted closer to the Y-axis direction at a greater degree. Namely, the linearity of the rays of light in the second light collecting regions A2 is greater than the linearity of the rays of light in the first light collecting regions A1.

In FIG. 6, a border between the first light collecting regions A1 and the second light collecting regions A2 is indicated by a dash-dot line extending in the X-axis direction. An outline of the display area AA is encircled by a dash-dot line. FIG. 6 schematically illustrates arrangement of the first lens sections 21A.

The degree of the linearity adjustment to the rays of light is greater in the first light collecting regions A1 of the first lens sections 21A closer to the LEDs 13 in the Y-axis direction (adjacent to the light entering surface 15A). Therefore, the light entering through the light entering surface 15A is less likely to spread in the areas adjacent to the light entering surface 15A and thus the rays of light are less likely to overlap each other. According to the configuration, bright spots are less likely to appear in an area of the light exiting surface 15B of the light guide plate 15 adjacent to the light entering surface 15A.

The degree of the linearity adjustment to the rays of light is less in the first light collecting regions A1 of the first lens sections 21A farther from the LEDs 13 in the Y-axis direction (adjacent to the opposite side surface 15D). Therefore, the light traveling through the light guide plate 15 is less likely to spread in the X-axis direction. According to the configuration, even if the positions of the LEDs 13 relative to the light entering surface 15A are not constant and an amount of light from the LED 13 farther from the light entering surface 15A is less than an amount of the light from the LED 13 closer to the light entering surface 15A, the light from the LED 13 closer to the light entering surface 15A is diffused in the X-axis direction and thus a sufficient amount of exiting light can be achieved. Therefore, a dark stripe (a display defect) is less likely to appear in the area closer to the LED 13 that is farther from the light entering surface 15A.

According to the configurations described above, uniformity of the luminance of light exiting through the light exiting surface 15B improves and thus ununiformity is less likely to occur in luminance of the light exiting from the backlight 12. With the light from the backlight 12, images are displayed on the liquid crystal panel 11 with high display quality.

As illustrated in FIG. 6, the first light collecting regions A1 of the first lens sections 21A are opposite the display area AA and the non-display area NAA. The second light collecting regions A2 of the first lens sections 21A are opposite the non-display area NAA. The light may leak out between the first light collecting regions A1 and the second light collecting regions A2. If the leakage light enters the display area AA, the leakage light may be recognized as a bright line. In this embodiment, the border between the first light collecting regions A1 and the second light collecting regions A2 is opposite the non-display area NAA but not the display area AA. Therefore, even if the light leaks out between the first light collecting regions A1 and the second light collecting regions A2, the leakage light is less likely to enter the display area AA. According to the configuration, degradation in image displayed in the display area AA.

A first distance between the light entering surface 15A of the light guide plate 15 and the border between the first light collecting regions A1 and the second light collecting regions A2 is less than a second distance between an edge of the display area AA adjacent to the light entering surface 15A and the light entering surface 15A, specifically, about a half. More specifically, the first distance and the second distance are about 1.7 mm and about 3.4 mm, respectively.

Figure 8:
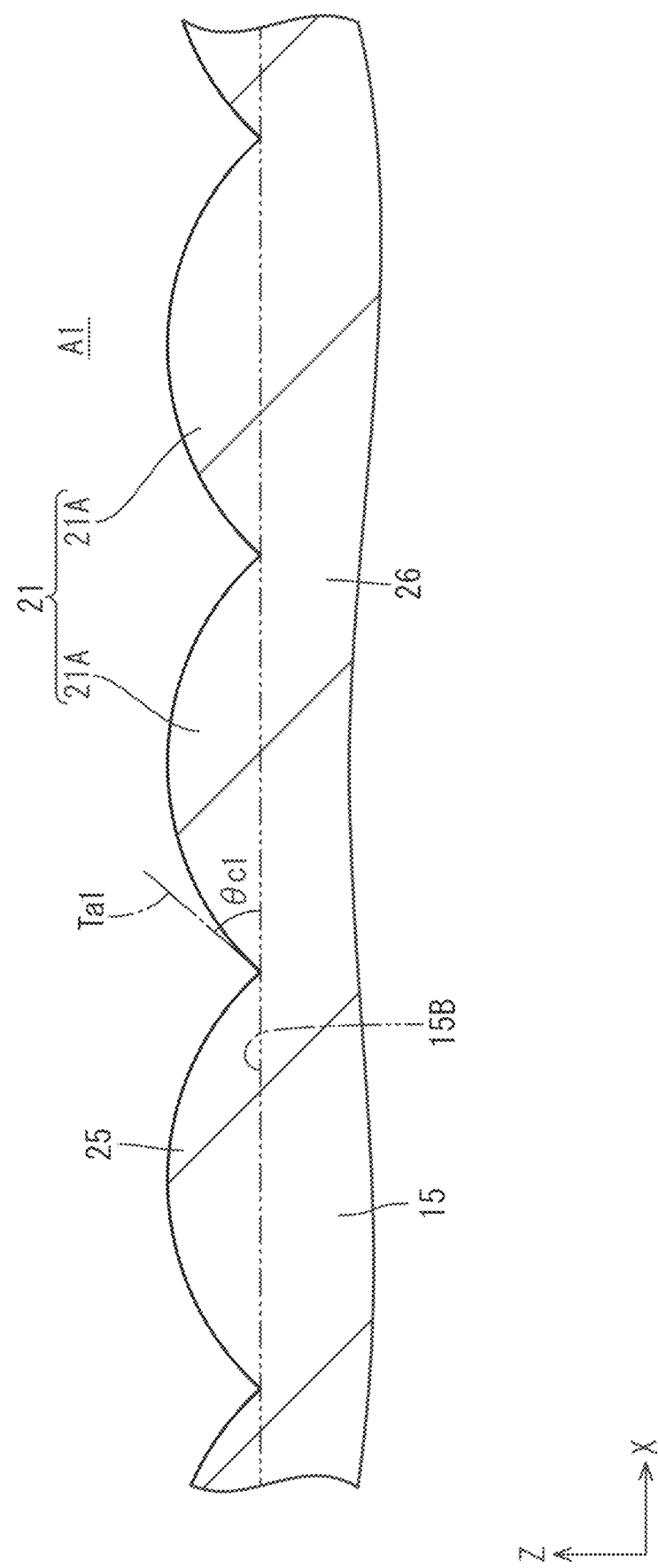
FIG. 8 is a cross-sectional view of first light collecting regions of first lens sections of a first lens portion cut in the X-axis direction.
Figure 9:
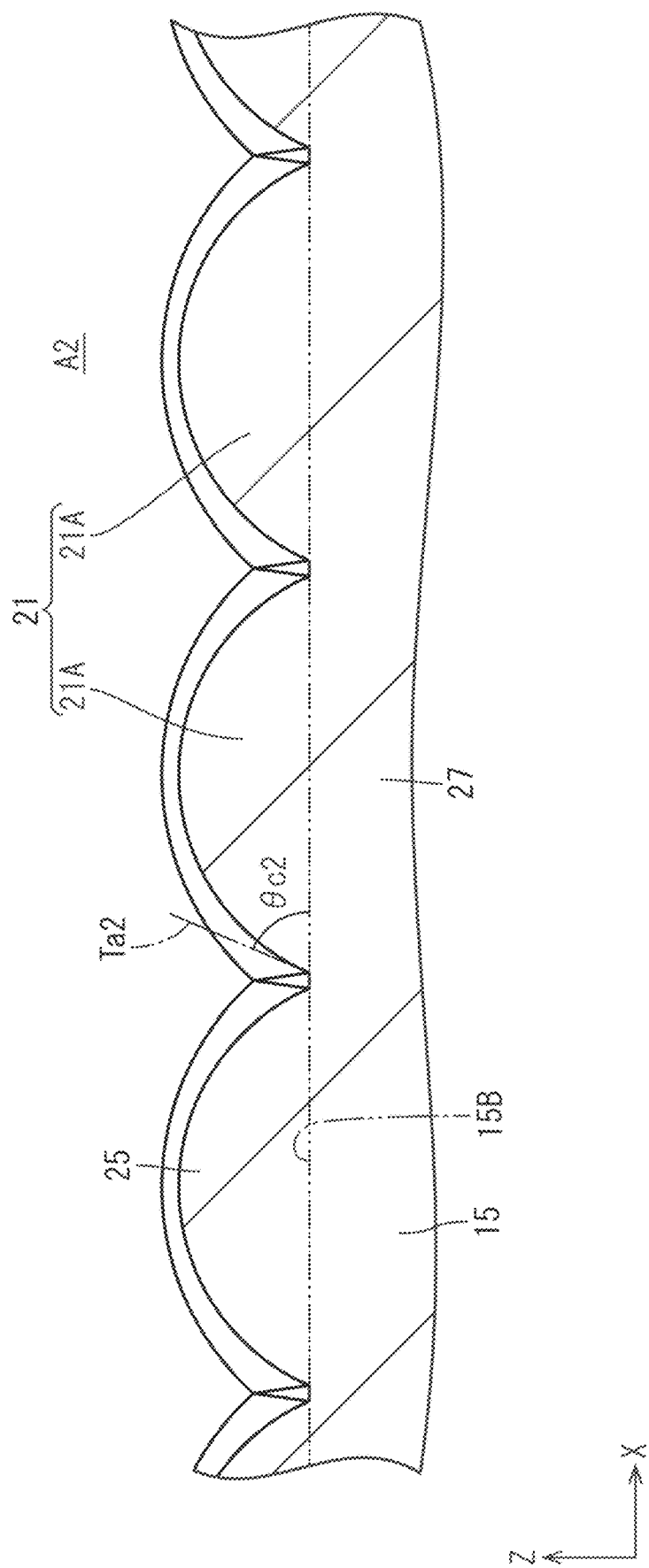
FIG. 9 is a cross-sectional view of second light collecting regions of the first lens sections cut in the X-axis direction.

The first light collecting regions A1 and the second light collecting regions A2 are configured as follows. As illustrated in FIG. 8, an angle of a tangent line Ta1 to a curved surface of each cylindrical lens 25 at a base of the cylindrical lens 25 relative to the X axis in the first light collecting region A1 is defined as a first tangent angle $\theta c1$. As illustrated in FIG. 9, an angle of a tangent line Ta2 to the curved surface of the cylindrical lens 25 at the base of the cylindrical lens 25 relative to the X-axis in the second light collecting region A2 is defined as a second tangent angle $\theta c2$. The first tangent angle $\theta c1$ and the second tangent angle $\theta c2$ are different from each other.

A degree of the linearity adjustment by the cylindrical lens 25 varies according to a degree of an angle of a tangent line to the curved surface of the cylindrical lens 25 at the base of the cylindrical lens 25. The greater the degrees of the angle, the greater the degree of the linearity adjustment. Because the second tangent angle $\theta c2$ is greater than the first tangent angle $\theta c1$, the degree of the linearity adjustment in the second light collecting region A2 is greater than the degree of the linearity adjustment in the first light collecting region A1.

According to the configuration, light being emitted by the LEDs 13 and entering the light guide plate 15 through the light entering surface 15A is less likely to be diffused in the X-axis direction and thus the rays of light are less likely to overlap each other in the area adjacent to the light entering surface 15A. Therefore, bright spots are less likely to appear in the area adjacent to the light entering surface 15A. Because the first tangent angle $\theta c1$ is less than the second tangent angle $\theta c2$, the degree of the linearity adjustment in the first light collecting region A1 is less than the degree of the linearity adjustment in the second light collecting region A2.

If the positions of the LEDs 13 relative to the light entering surface 15A are not constant, the amount of light from the LED 13 farther from the light entering surface 15A and entering the light guide plate 15 may be less than the amount of light from other LEDs 13. The light from other LEDs 13 entering the light guide plate 15 through the lithe entering surface 15A is diffused in the X-axis direction in the first light collecting regions A1. Therefore, a sufficient amount of exiting light can be achieved and thus a dark stripe (a display defect) is less likely to appear in the area adjacent to the LED 13 that is farther from the light entering surface 15A.

Specifically, the first tangent angle $\theta c1$ illustrated in FIG. 8 is in a range from 30° to 50°, for instance, about 49°. When the first tangent angle $\theta c1$ is equal to 30° or greater, the degree of the linearity adjustment in the first light collecting regions A1 is greater in comparison to a configuration in which the first tangent angle $\theta c1$ is less than 30°. Therefore, the luminance of the exiting light through the first light collecting regions A1 can be maintained at a greater level.

When the first tangent angle $\theta c1$ is equal to 50° or less, the degree of the linearity adjustment in the first light collecting regions A1 is less likely to be excessive. Therefore, even if the positions of the LEDs 13 relative to the light entering surface 15A are not constant, a dark stripe is less likely to appear in the area adjacent to the LED 13 that is farther from the light entering surface 15A.

The second tangent angle $\theta c2$ illustrated in FIG. 9 is in a range from 55° to 70°, for instance, about 67°. When the second tangent angle $\theta c2$ is equal to 55° or greater, the degree of the linearity adjustment in the second light collecting regions A2 is greater in comparison to a configuration in which the second tangent angle $\theta c2$ is less than 55°. Therefore, bright spots are less likely to appear in the area adjacent to the light entering surface 15A.

When the second tangent angle $\theta c2$ is equal to 70° or less, the degree of the linearity adjustment in the second light collecting regions A2 is less likely to be excessive. Therefore, ununiformity of the luminance according to the arrangement of the LEDs 13 that are arranged at intervals in the X-axis direction is less likely to occur in the area adjacent to the light entering surface 15A. The ununiformity of the luminance may be recognized in the area adjacent to the light entering surface 15A if the light from the LEDs 13 is not diffused in the light guide plate 15 because the LEDs 13 are arranged at intervals on the LED substrate and the light entering surface 15A includes sections that are not opposed to the LEDs 13.

The first lens sections 21A exclusively include cylindrical lenses 25. The cylindrical lenses 25 are convex lenses that protrude toward the front side. The cylindrical lenses 25 linearly extend in the Y-axis direction. Each cylindrical lens 25 has a half rod shape with a semicircular cross section along the X-axis direction. The cylindrical lenses 25 include first portions in the first light collecting regions A1 and second portions in the second light collecting regions A2.

Figure 7:
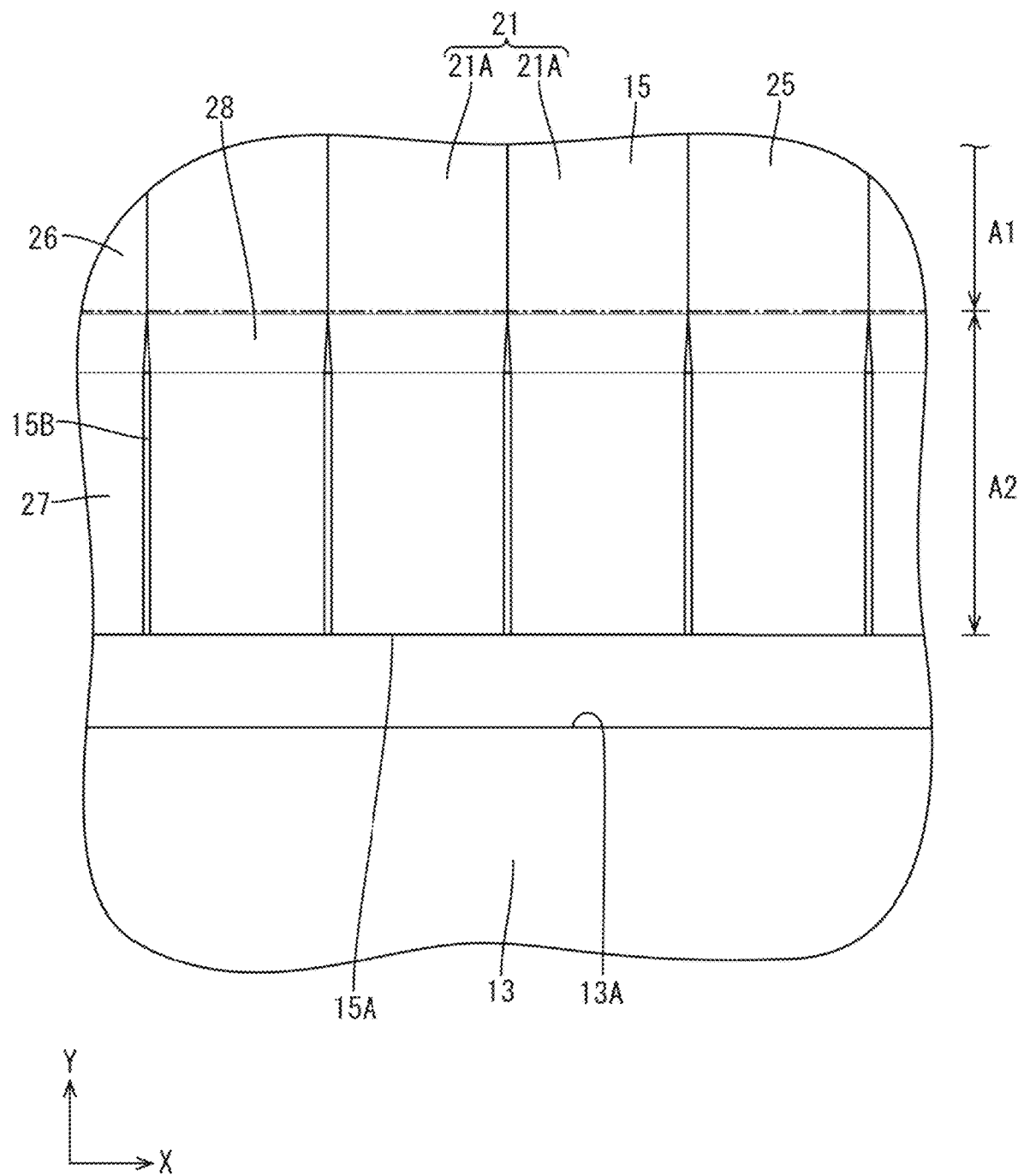
FIG. 7 is a magnified plan view of an LED and the light guide plate.

As illustrated in FIGS. 7 to 9, the cylindrical lenses 25 are arranged such that the middle of the first light collecting region A1 and the middle of the second light collecting region A2 of each first lens section 21A are aligned in the X-axis direction. The first portions and the second portions of the cylindrical lenses 25 are arranged at the same intervals in the X-axis direction. Namely, each first portions continue into the respective second portions without gaps. An angle of tangent gradually changes from the first tangent angle $\theta c1$ to the second tangent angle $\theta c2$ around the border between the first portion and the second portion of each cylindrical lens 25. The intervals of the first portions of the cylindrical lenses 25 in the first light collecting region A1 and the second portions of the cylindrical lenses 25 in the second light collecting regions A2 in the X-axis direction are constant. The interval may be about 0.038 mm.

According to the configuration, in comparison to a configuration in which the intervals of the first portions and the second portions of the cylindrical lenses 25 are different from each other, the light entering through the light entering surface 15A and traveling from the second light collecting region A2 to the first light collecting region A1 is less likely to leak out. Therefore, the light use efficiency is less likely to decrease and the luminance is less likely to decrease.

The height of the second portions of the cylindrical lenses 25 in the second light collecting regions A2 is greater than the height of the first portions of the cylindrical lenses 25 in the first light collecting region A1. The curvature radius of the second portions of the cylindrical lenses 25 is less than the curvature radius of the first portions of the cylindrical lenses 25. Specifically, the height and the curvature radius of the first portions of the cylindrical lenses 25 are about 0.00845 mm and about 0.0248 mm, respectively. The height and the curvature radius of the second portions of the cylindrical lenses 25 are about 0.01197 mm and about 0.0199 mm, respectively.

Figure 10:
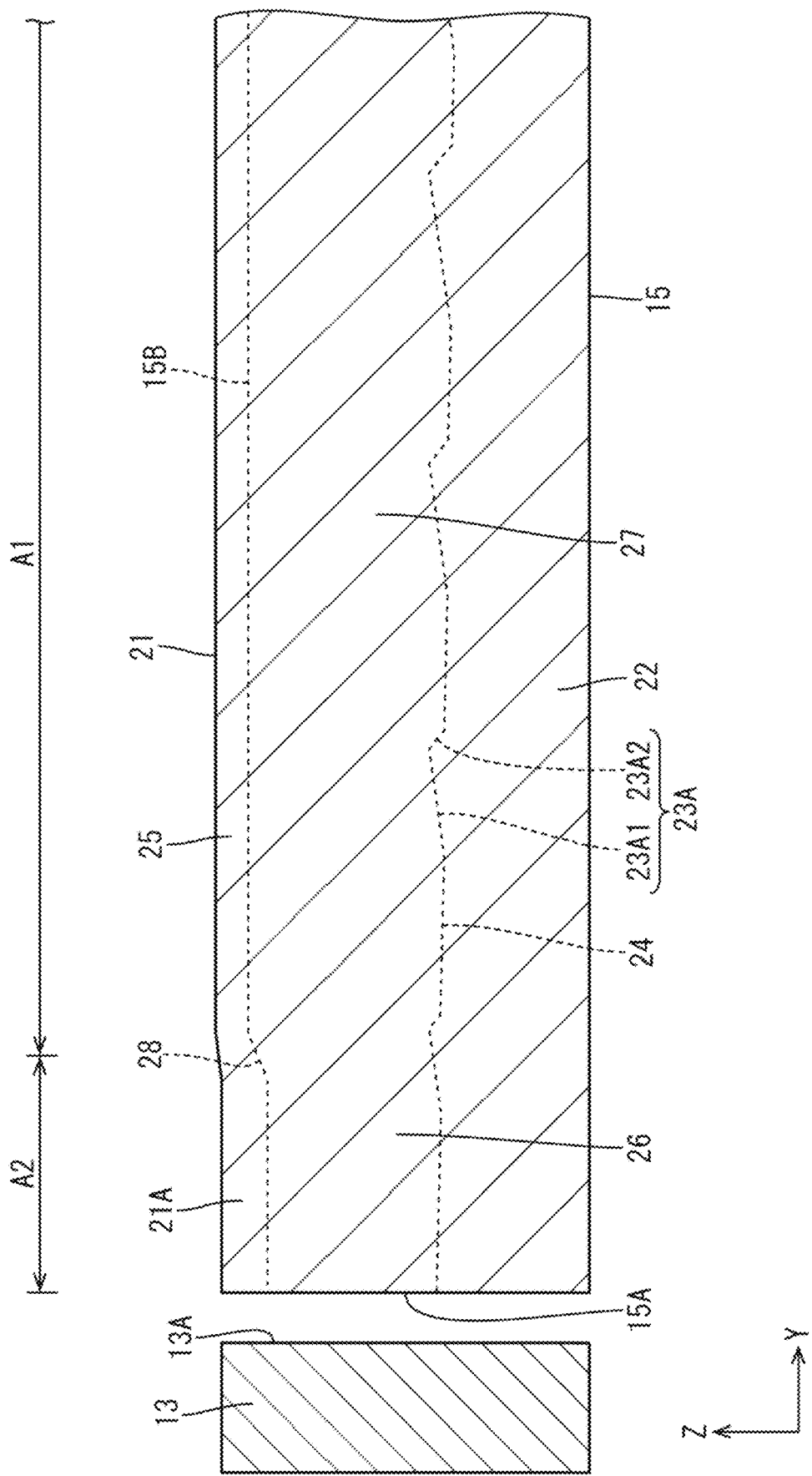
FIG. 10 is a cross-sectional view illustrating the LED and the light guide plate cut in the Y-axis direction.
Figure 11:
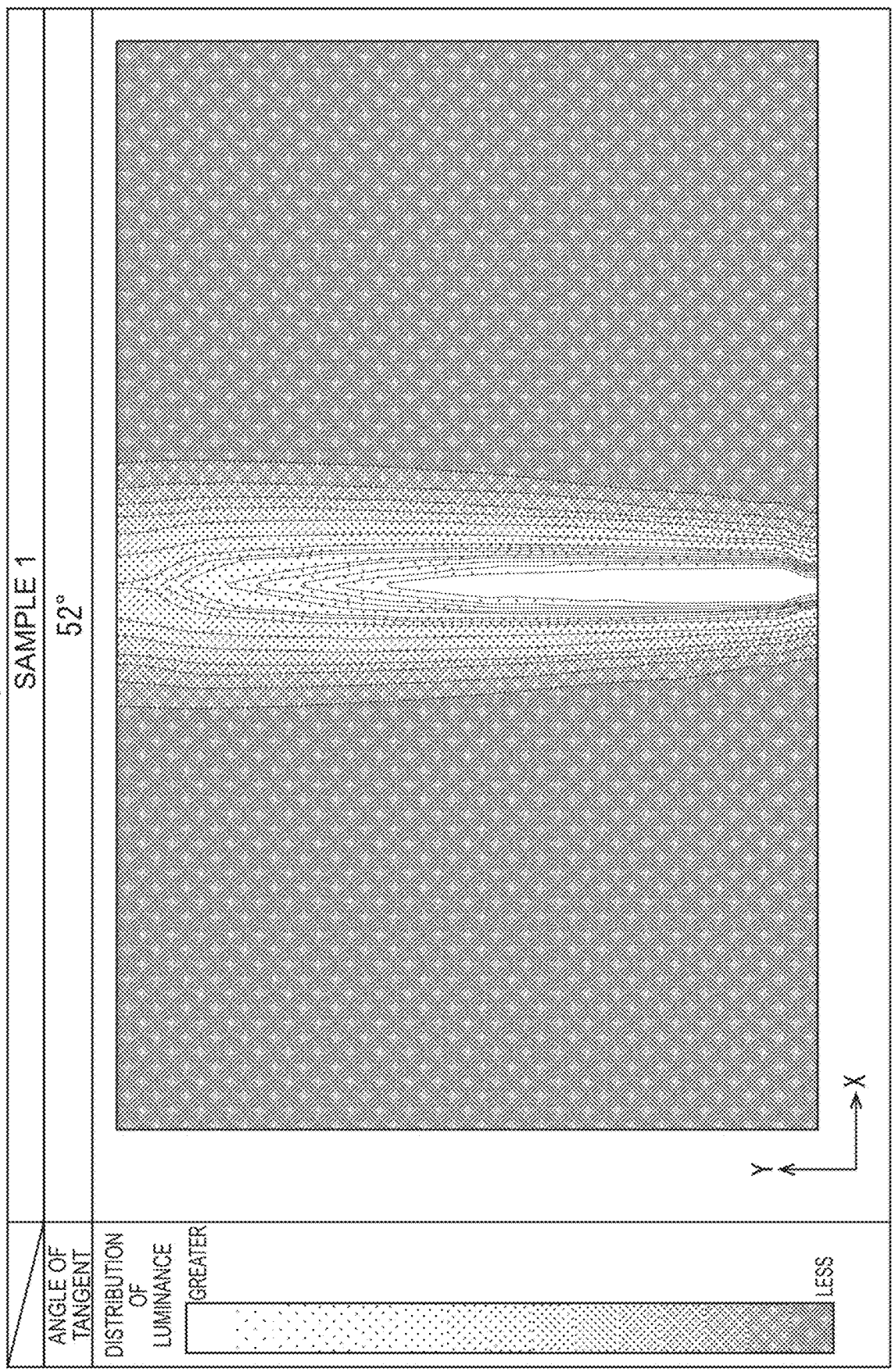
FIG. 11 is a table presenting results of experiment 1 regarding sample 1.
Figure 12:
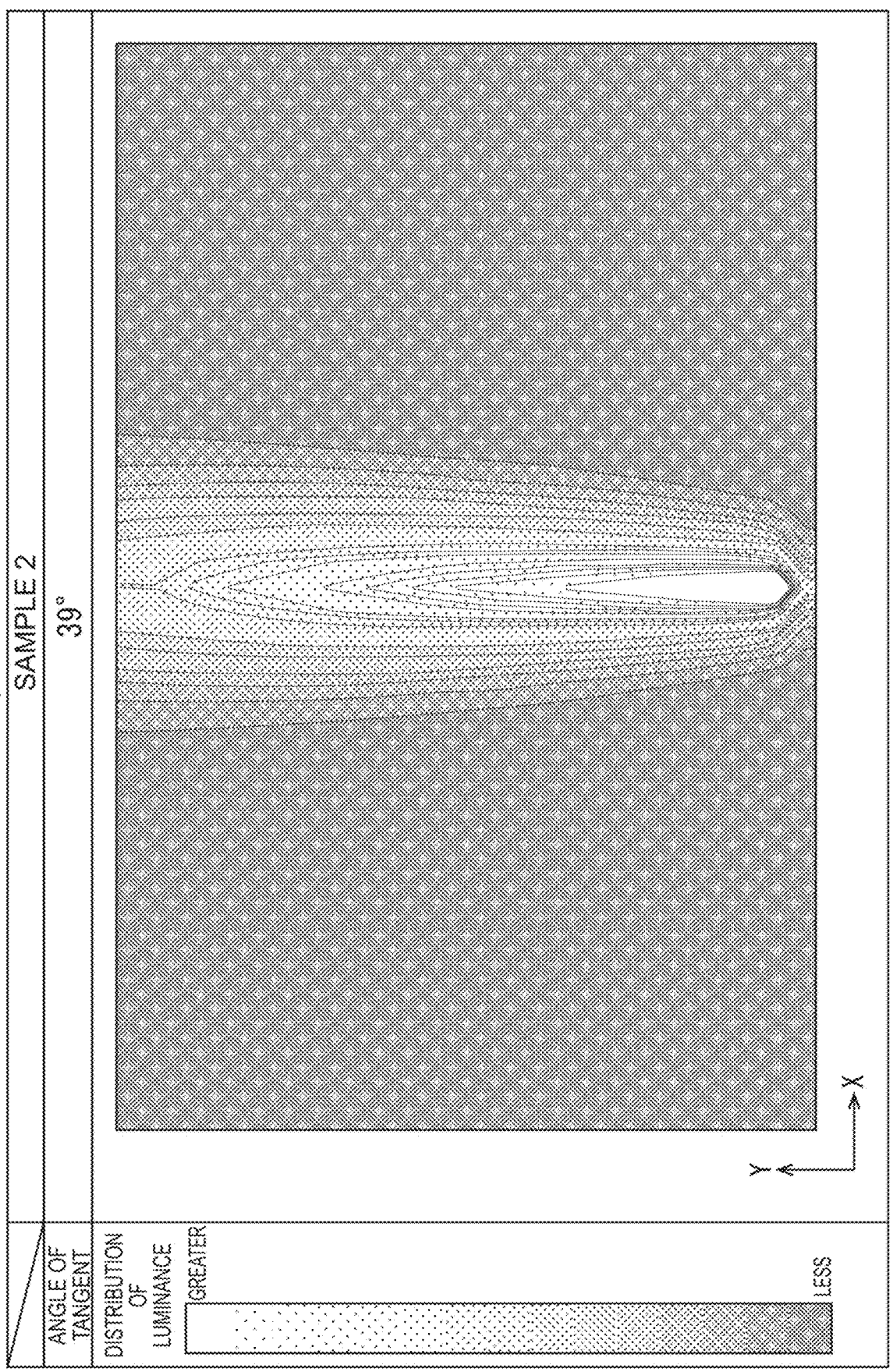
FIG. 12 is a table presenting results of experiment 1 regarding sample 2.
Figure 13:
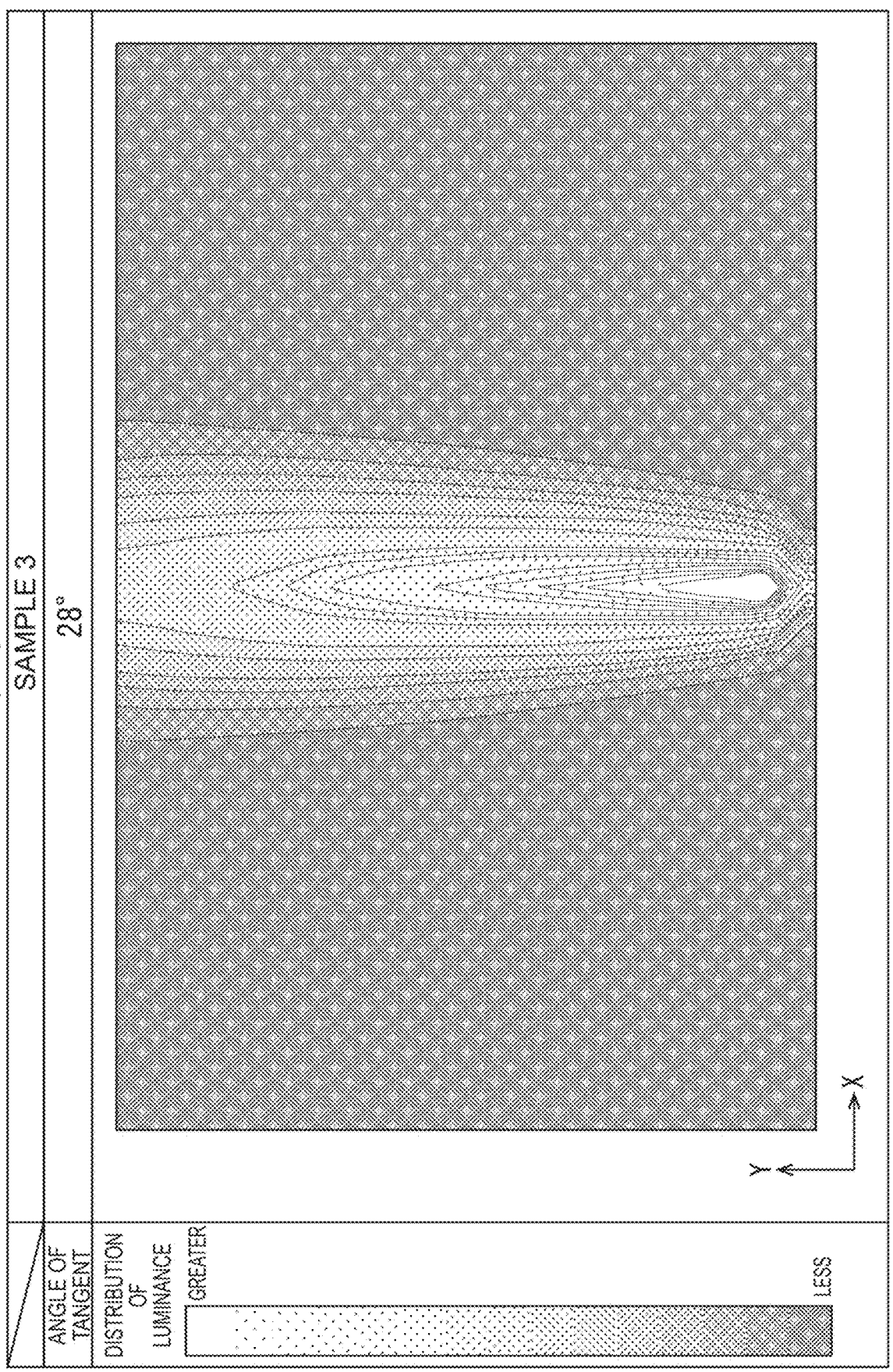
FIG. 13 is a table presenting results of experiment 1 regarding sample 3.
Figure 14:
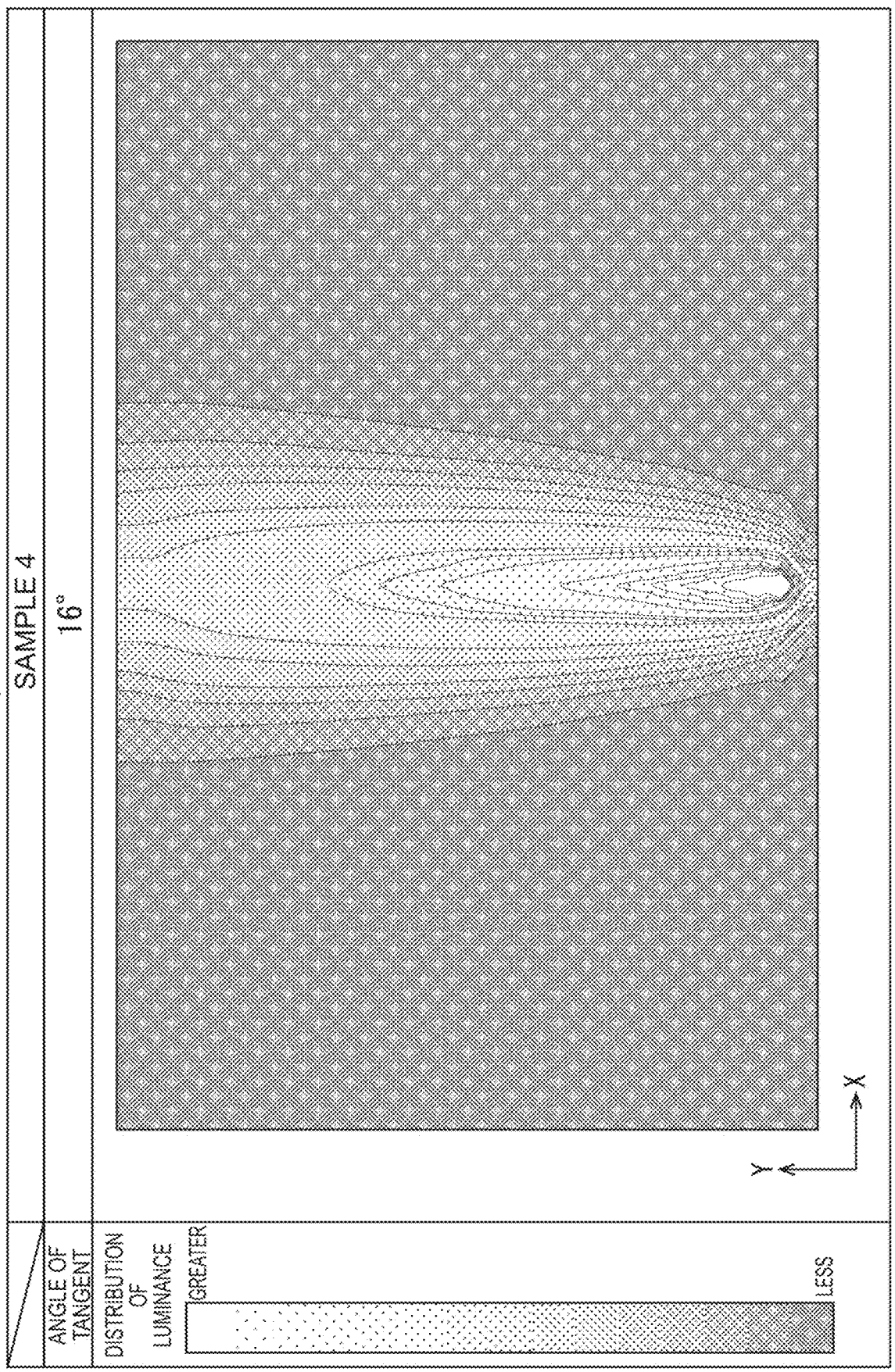
FIG. 14 is a table presenting results of experiment 1 regarding sample 4.

As illustrated in FIG. 10, the light guide plate 15 includes a first light guide portion 26 and a second light guide portion 27. The first light guide portion 26 includes the first light collecting region A1 of the first lens portion 21 (the first portions of the cylindrical lenses 25). The second light guide portion 27 includes the second light collecting region A2 of the first lens portion 21 (the second portions of the cylindrical lenses 25).

The first light collecting regions A1 are located in an entire area of the first light guide portion 26. The first light guide portion 26 is opposed to the display area AA and the non-display area NAA of the liquid crystal panel 11. The second light collecting regions A2 are located in an entire area of the second light guide portion 27. The second light guide portion 27 is opposed to the non-display area NAA of the liquid crystal panel 11 but not opposed to the display area AA.

The first light guide portion 26 has a thickness (a dimension in the Z-axis direction) different from a thickness of the second light guide portion 27. The thickness of the second light guide portion 27 is less than the thickness of the first light guide portion 26. Edges of the first light guide portion 26 and the second light guide portion 27 adjacent to each other and to the light exiting surface 15B are connected with an inclined surface 28 to smooth transition from the first light guide portion 26 to the second light guide portion 27 without a step.

According to the configuration, the light is less likely to leak out between the first light guide portion 26 and the second light guide portion 27. A difference in thickness between the first light guide portion 26 and the second light guide portion 27 is greater than a difference in height between the first portion and the second portion of each cylindrical lens 25. The height of the second portion of each cylindrical lens 25 measuring in the Z-axis direction is less than the height of the first portion of each cylindrical lens 25 measuring in the Z-axis direction. Specifically, the difference in thickness between the first light guide portion 26 and the second light guide portion 27 is about 0.005 mm.

Because the second light guide portion 27 has the thickness less than the thickness of the first light guide portion 26, the light entering through the light entering surface 15A and traveling in the Y-axis direction from the second light guide portion 27 to the first light guide portion 26 is less likely to leak out in comparison to a configuration in which the second light guide portion 27 has a thickness greater than the thickness of the first light guide portion 26. Therefore, the light use efficiency is less likely to decrease and thus the luminance is less likely to decrease.

Because the first light guide portion 26 has the thickness greater than the thickness of the second light guide portion 27, the light traveling through the first light guide portion 26 is more likely to be diffused in the X-axis direction. Even if the positions of the LEDs 13 relative to the light entering surface 15A are not constant, the light is more likely to be diffused in the X-axis direction in the first light guide portion 26 and thus differences in amount of light being emitted by the LEDs 13 and entering the light guide plate 15 are compensated. Therefore, a sufficient amount of light is more likely to be obtained. According to the configuration, a dark tripe is less likely to appear in the area adjacent to the LED 13 farther from the light entering surface 15A.

To confirm advantageous effects of the backlight 12 and the liquid crystal display device 10, experiment 1 and comparative experiments 1 and 2 were conducted.

Experiment 1 was conducted to observe how the linearity of the rays of light changed according to angles of tangent of cylindrical lenses. In experiment 1, four samples were used. Sample 1 includes a first light guide plate. Sample 2 includes a second light guide plate. Sample 3 includes a third light guide plate. Sample 4 includes a fourth light guide plate. The first to the fourth light guide plates have the configurations similar to the configuration of the light guide plate 15 descried above except that each of the light guide plates has a constant angle of tangent.

The first light guide plate includes cylindrical lenses each having an angle of tangent of 52°. The second light guide plate includes cylindrical lenses each having an angle of tangent of 39°. The fourth light guide plate includes cylindrical lenses each having an angle of tangent of 28°. The fourth light guide plate includes cylindrical lenses each having an angle of tangent of 16°.

In experiment 1, a single LED was disposed opposite the middle of a light entering surface of each of the first to the fourth light guide plates (at the middle of the light guide plate in the X-axis direction). Luminance of light exiting through a light exiting surface of each of the first to the fourth light guide plates was measured. Distributions of luminance on the light exiting surfaces were illustrated in gray scales. A Graph of the distributions of luminance with respect to the X-axis direction was created.

Figure 15:
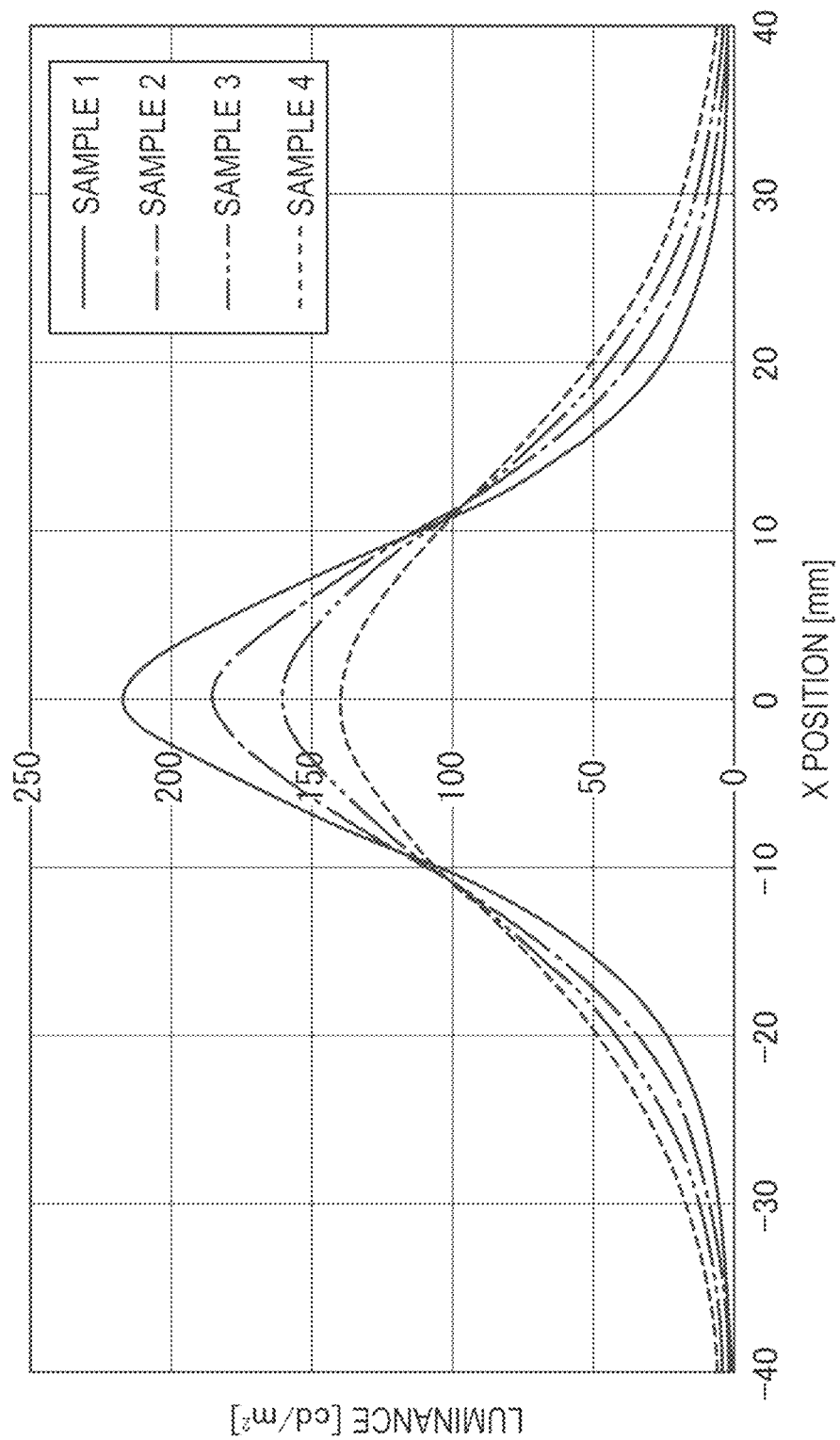
FIG. 15 is a graph presenting distributions of luminance in the X-axis direction regarding samples 1 to 4.

The results of experiments 1 through 4 are present in FIGS. 11 to 15. A cell in the second low and the second column of each table represents the degree of tangent. A cell in the third low and the third column in each table represents the distribution of luminance on the light exiting surface. Degrees of the luminance are expressed by shading of gray. Lighter gray indicates greater luminance and darker gray indicates less luminance. In FIG. 15, the vertical axis represents the luminance in unit of cd/m$^2$ and the horizontal axis represents X positions in unit of mm, that is, distances from a reference position (0 mm) at the middle with respect to the X-axis direction. In FIG. 15, minus (−) indicates a left region of the distributions of luminance in FIGS. 11 to 14 relative to the reference position and plus (+) indicates a right region of the distributions of luminance in FIGS. 11 to 14 relative to the reference position.

Through comparisons among the results of experiments 1 to 4 in FIGS. 11 to 14, the following tendencies are observed. As the angle of tangent of the cylindrical lenses increases, a greater luminance area elongates in the Y-axis direction and increases. As the angle of tangent of the cylindrical lenses decreases, the greater luminance area expands in the X-axis direction and decreases.

In FIG. 15, the following tendencies are observed. As the angle of tangent of the cylindrical lenses increases, the luminance at the middle with respect to the X-axis direction increases and the luminance at positions about 10 mm or greater from the middle decreases. As the angle of tangent of the cylindrical lenses decreases, the luminance at the middle with respect to the X-axis direction decreases and the luminance at positions about 10 mm or greater from the middle increases.

From the results of experiments 1 to 4, the following assumptions may be made. As the angle of tangent of the cylindrical lenses increases, rays of light are more efficiently reflected by the curved surface and thus the rays of light are more likely to travel closer to the straight direction. Namely, the rays of light are less likely to spread in the X-axis direction. As the angle of tangent of the cylindrical lenses decreases, the rays of light are less efficiently reflected by the curved surface and thus the rays of light less more likely to travel closer to the straight direction. Namely, the rays of light are more likely to spread in the X-axis direction.

Comparative experiment 1 and 2 will be described. In comparative experiment 1 and 2, embodiment 1 and comparative examples 1 and 2 were used. Embodiment 1 included the light guide plate 15 described earlier. Comparative examples 1 and 2 included cylindrical lenses that had constant angles of tangent. In comparative experiment 1, luminance distributions of embodiment 1 and comparative examples 1 and 2 relative to light entering surfaces of which positions of LEDs 13 were not constant. In comparative experiment 2, luminance distributions of embodiment 1 and comparative examples 1 and 2 relative to light entering surfaces of which positions of LEDs 13 were constant. The light guide plates in comparative examples 1 and 2 have configurations similar to the light guide plate 15 except for the constant angles of tangent.

The angle of tangent of the cylindrical lenses included in the light guide plate in comparative example 1 is 49° and constant for an entire length of the cylindrical lenses. The angle of tangent of the cylindrical lenses included in the light guide plate in comparative example 2 is 63° and constant for an entire length of the cylindrical lenses. In embodiment 1, the first tangent angle θc1 of the first portion of the cylindrical lenses 25 is 49° and the second tangent angle θc2 of the second portion of the cylindrical lenses 25 is 67° (see FIGS. 8 and 9).

Figure 16:
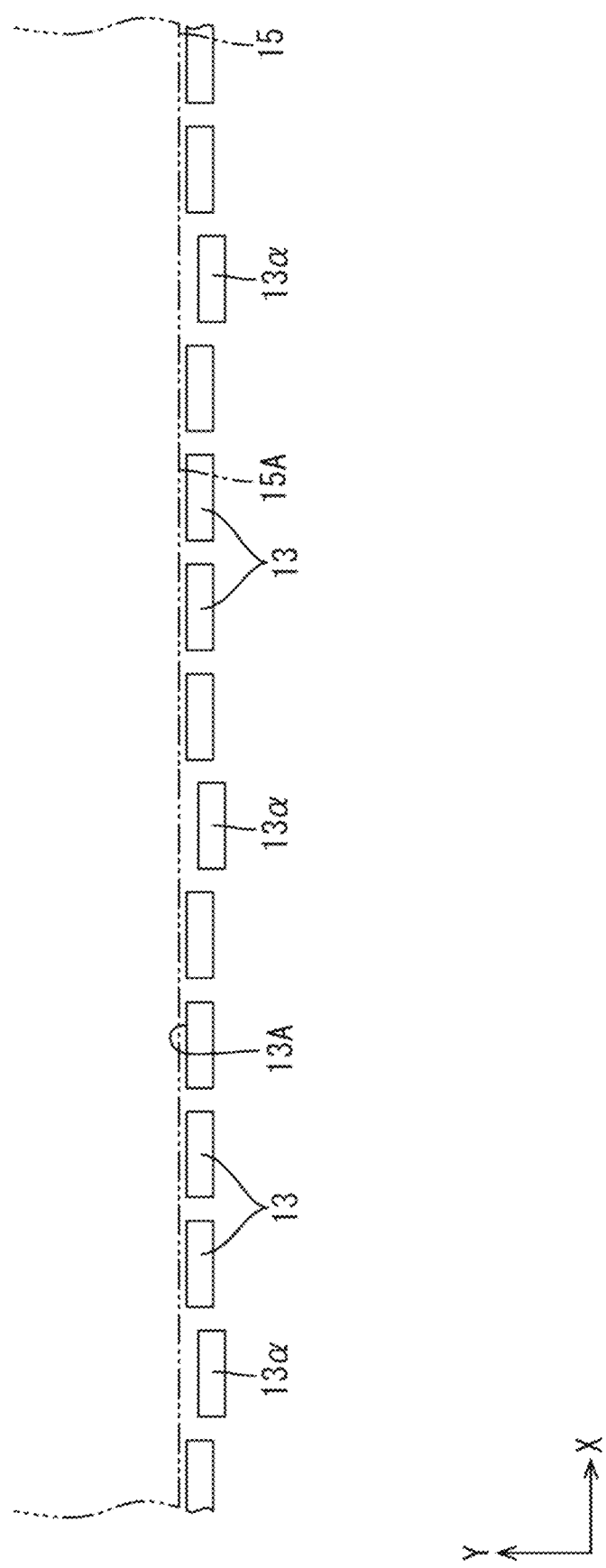
FIG. 16 is a plan view of LEDs and a light guide plate used in comparative experiment 1.

Comparative experiment 1 will be described in detail. As illustrated in FIG. 16, some of the LEDs 13 arranged in the X-axis direction were at positions shifted in the Y-axis direction and defined as shifted LEDs 13a. More specifically, a distance between the light entering surface 15A and the fifth LED 13 (the shifted LED 13a) in every five LEDs 13 with respect to an edge of the light entering surface 15A is 0.1 mm greater than a distance between the light entering surface 15A and the other LEDs 13 in the Y-axis direction. In FIG. 16, the light entering surface 15A is indicated by dash-dot-dot-dash line.

In comparative experiment 1, the LEDs 13 and the shifted LEDs 13a were all turned on so that light emitted by the LEDs 13 and the shifted LEDs 13a entered the light guide plate 15 through the light entering surface 15A and the light guide plates in comparative examples 1 and 2 through the light entering surfaces. The luminance of the light exiting through the light exiting surfaces was measured and Michelson contrast (Cm) values were calculated from the luminance to determine whether ununiformity of the luminance was observed. Each Cm value was calculated by dividing a subtraction of a minimum value of luminance of the exiting light from a maximum value of luminance of the exiting light by a sum of the minimum value and the maximum value.

A greater Cm value indicates a greater difference between the maximum value and the minimum value and the sum of the maximum value and the minimum value is less. Namely, the ununiformity of the luminance is more likely to be observed. A less Cm value indicates a less difference between the maximum value and the minimum value and the sum of the maximum value and the minimum value is greater. Namely, the ununiformity of the luminance is less likely to be observed. The observation of the ununiformity of the luminance was performed by an inspector by viewing captured images.

Figure 17:
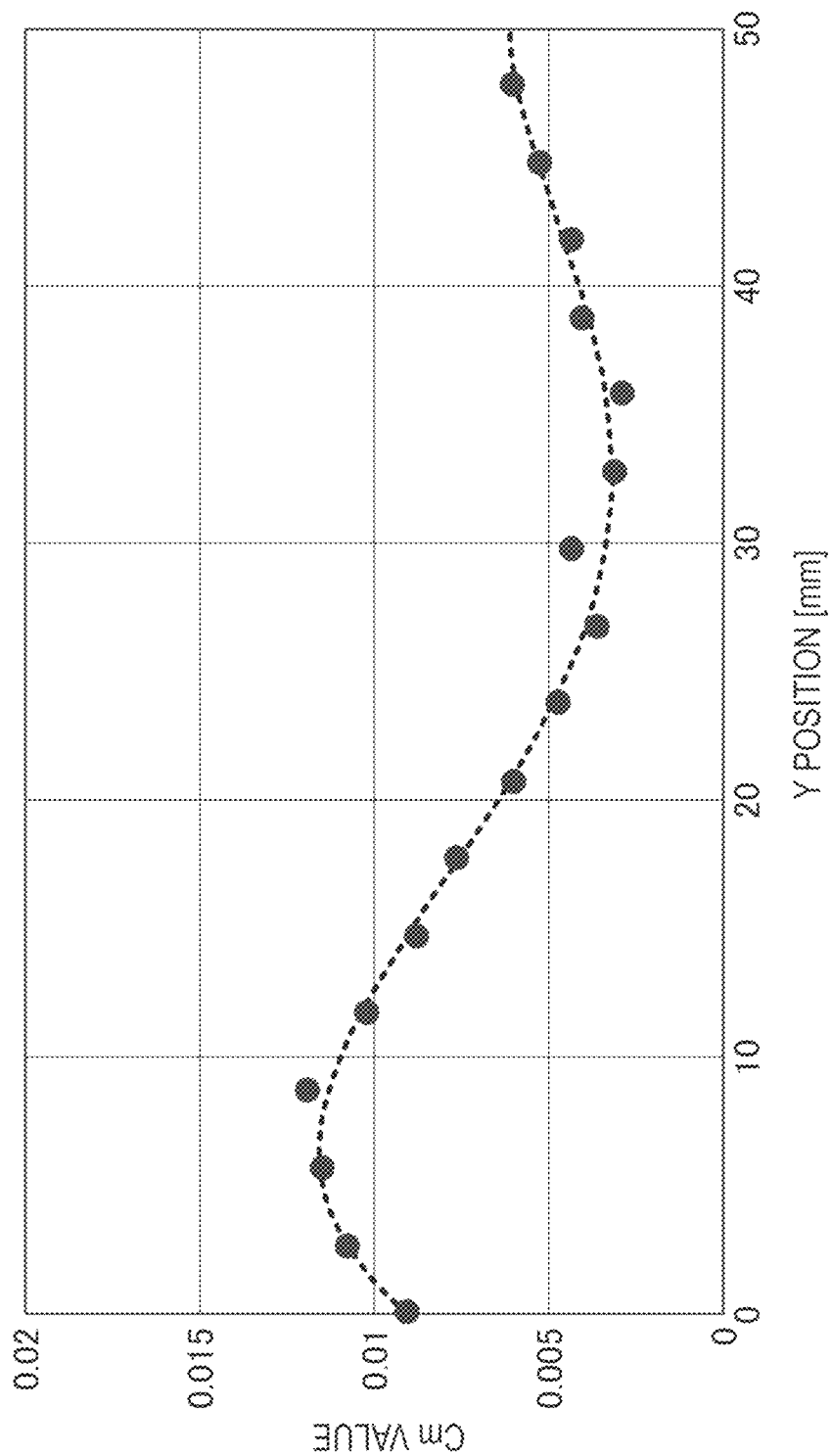
FIG. 17 is a graph presenting a relation between Y position and Cm value in comparative experiment 1 regarding comparative example 1.
Figure 18:
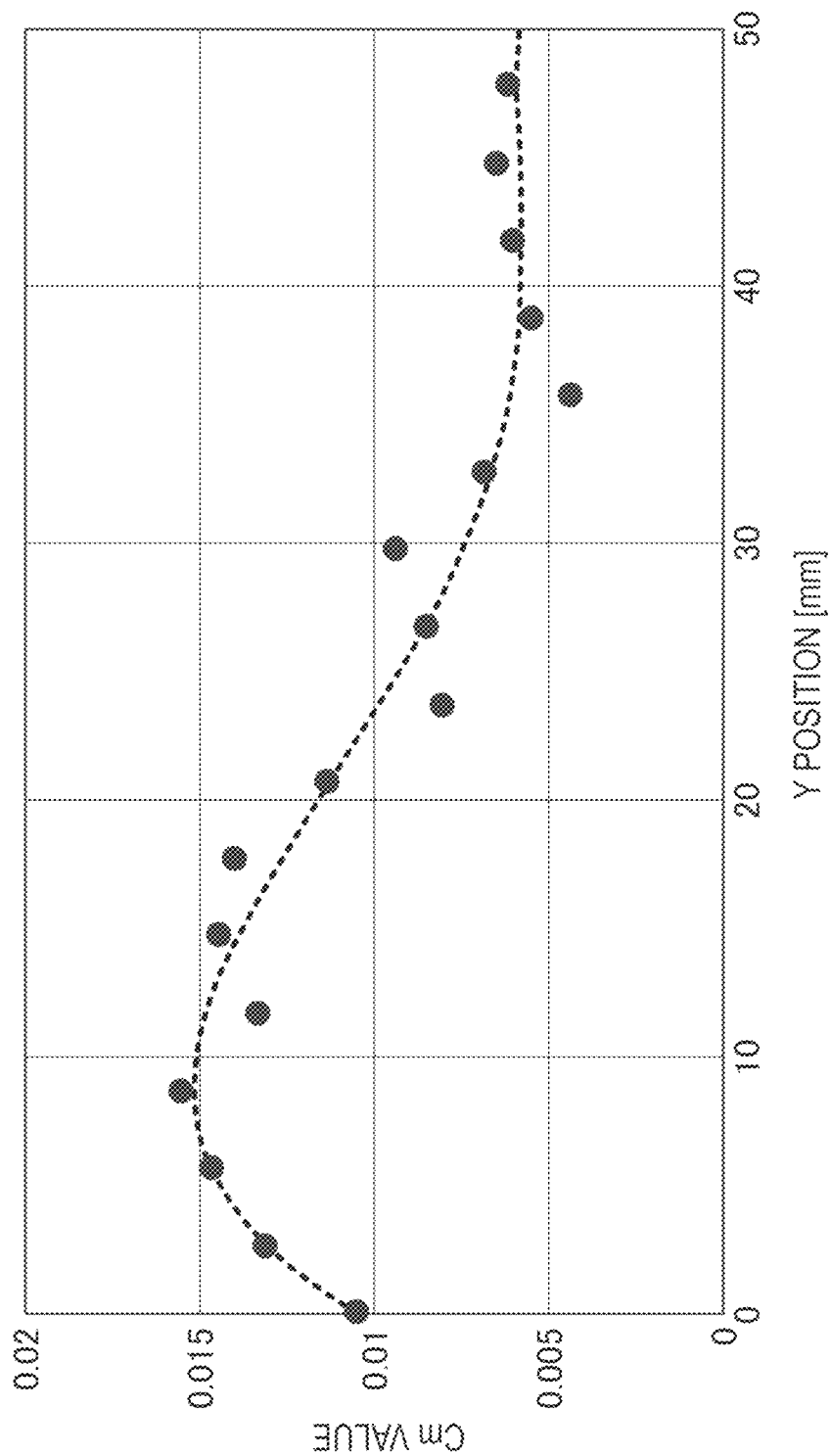
FIG. 18 is a graph presenting a relation between Y position and Cm value in comparative experiment 1 regarding comparative example 2.
Figure 19:
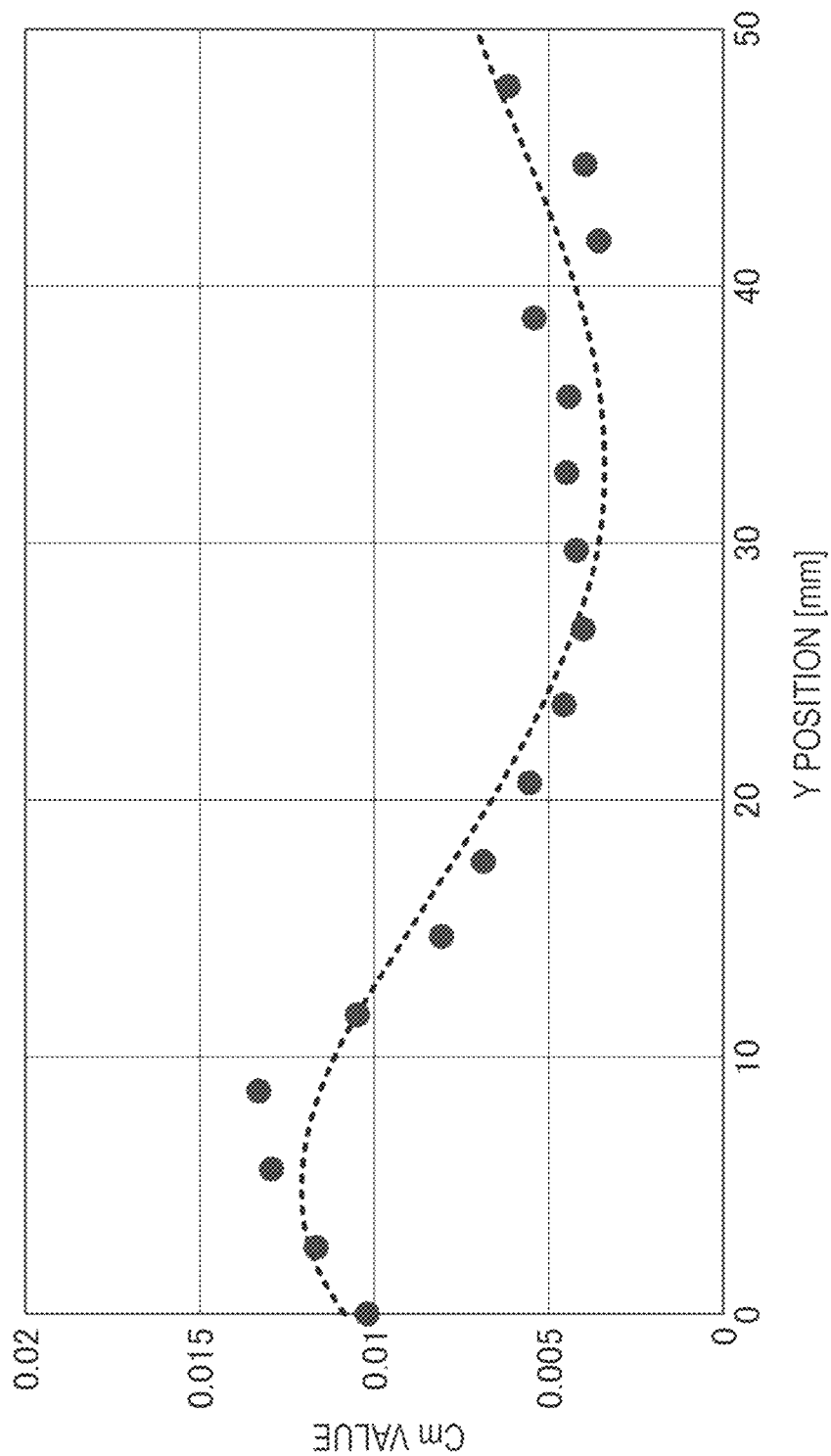
FIG. 19 is a graph presenting a relation between Y position and Cm value in comparative experiment 1 regarding embodiment 1.

The results of comparative experiment 1 are present in FIGS. 17 to 20. Specifically, relationships between Y positions on the light exiting surfaces in comparative examples 1 and 2 and embodiment 1 and the Cm values are present in FIGS. 17 to 19. The angles of tangent of the cylindrical lenses in embodiment 1 and comparative examples 1 and 2, averages of the Cm values, and evaluations are present in FIG. 20. In FIGS. 17 to 19, the horizontal axes represent Y positions in unit of mm, that is, distances between points on the light exiting surfaces and the light entering surfaces (at 0 mm) in the Y-axis direction. The averages present in FIG. 20 have been calculated based on the Cm values present in FIGS. 17 to 19, respectively. The evaluations present in FIG. 20 include "Fair" and "Bad". "Fair" indicates a result that the ununiformity of luminance was not practically observed. "Bad" indicates a result that the ununiformity of luminance was observed.

The results of comparative experiment 1 will be described. The Cm values of comparative example 1 (FIG. 17) and embodiment 1 (FIG. 19) are less than the Cm values of comparative example 2 (FIG. 18). The Cm values at the Y positions around 10 mm are especially less. According to FIG. 20, the ununiformity of luminance was not practically observed on comparative example and embodiment 1. The averages of the Cm values of the comparative example 1 and embodiment 1 are less than the averages of the Cm values of comparative example 2. The ununiformity of luminance was observed on comparative example 2. The average of the Cm values is greater than the averages of the Cm values of comparative example 1 and embodiment 1.

From the above results, the following assumption may be made. The angle of tangent of the cylindrical lenses in comparative example 2 is 63°, which is relatively larger. A degree of linearity adjustment to the light entering through the light entering surface along the Y-axis direction is greater. The light is less likely to be diffused in the X-axis direction. Even if an amount of light from the shifted LEDs 13a to the light guide plate through the light entering surface is less than an amount of light from other LEDs 13, the light from the other LEDs 13 is less likely to be directed toward areas opposed to the shifted LEDs 13a. Therefore, dark stripes may be observed in the areas opposed to the shifted LEDs 13a.

The angle of tangent of the cylindrical lenses in comparative example 1 is 49°, which is relatively smaller. A degree of linearity adjustment to the light entering through the light entering surface along the Y-axis direction is less than the degree of linearity adjustment in comparative example 2. The light is more likely to be diffused in the X-axis direction. If an amount of light from the shifted LEDs 13a to the light guide plate through the light entering surface is less than an amount of light from other LEDs 13, the light from the other LEDs 13 is more likely to be directed toward areas opposed to the shifted LEDs 13a. Therefore, dark stripes may be less likely to be observed in the areas opposed to the shifted LEDs 13a.

In embodiment 1, the first tangent angle θc1 of the first portions of the cylindrical lenses 25 in the first light collecting region A1 is 49°, which is equal to the angle of tangent of the cylindrical lenses in comparative example 1. A degree of linearity adjustment to the light entering through the light entering surface is less than the degree of linearity adjustment in comparative example 2 and about equal to the degree of linearity adjustment in comparative example 1. If an amount of light from the shifted LEDs 13a to the light guide plate 15 through the light entering surface 15A is less than an amount of light from other LEDs 13, the light from the other LEDs 13 is more likely to be directed toward areas opposite the shifted LEDs 13a. Therefore, dark stripes are less likely to be observed in the areas opposed to the shifted LEDs 13a.

Comparative experiment 2 will be described in detail. In comparative experiment 2, all the LEDs 13, the positions of which relative to the light entering surfaces are constant, were turned on to enter the light into the light guide plates through the light entering surfaces in embodiment 1 and comparative examples 1 and 2. Images were captured from the front side and presence of the ununiformity of luminance was determined based on the captured images. The luminance of the exiting light through the light exiting surfaces was measured and Cm values were calculated from the luminance. The determination of the ununiformity of luminance was performed by the inspector by viewing the captured images. The Cm values were calculated in the same manner as comparative experiment 1.

The results of comparative experiment 2 are present in FIG. 21. Specifically, the angles of tangent of the cylindrical lenses in embodiment 1 and comparative examples 1 and 2, the captured images, maximum Cm values, and evaluations are present in FIG. 21. The maximum Cm values in FIG. 21 is among the Cm values at positions between the light entering surface of each light guide plate and 20 mm from the light entering surface in the Y-axis direction. Namely, the maximum Cm values indicate the worst degrees of the ununiformity of luminance assumed in the areas adjacent to the light entering surface of the light guide plate. In FIG. 21, "Good" indicates a result that the ununiformity of luminance was not observed and "Bad" indicates a result that the ununiformity of luminance was observed. "Good" indicates a greater level of uniformity of luminance in comparison to "Fair" in FIG. 20.

The results of comparative experiment 2 will be described. As illustrated in FIG. 21, the ununiformity of luminance was not observed on comparative example 2 and embodiment 1. The Cm values of comparative example 2 and embodiment 1 are less than the Cm values of comparative example 1. The ununiformity of luminance was observed on comparative example 1. The maximum Cm value of comparative example 1 is greater than the maximum Cm values of comparative example 2 and embodiment 1.

From the above results, the following assumption may be made. The angle of tangent of the cylindrical lenses in comparative example 1 is 49°, which is relatively smaller. A degree of linearity adjustment to the light entering through the light entering surface along the Y-axis direction is less than a degree of linearity adjustment in comparative example 2. The light is more likely to be diffused in the X-axis direction. Therefore, rays of light from the LEDs are more likely to overlap each other in the area adjacent to the light entering surface. An amount of light exiting through areas of the light exiting surface adjacent to areas of an LED substrate between the LEDs may increase and the areas may be recognized as bright spots.

The angle of tangent of the cylindrical lenses in comparative example 2 is 63°, which is relatively lager. A degree of linearity adjustment to the light entering through the light entering surface along the Y-axis direction is greater. Therefore, light is less likely to be diffused in the X-axis direction. The light is less likely to be diffused in the X-axis direction in the area adjacent to the light entering surface and thus rays of light are less likely to overlap each other. From the reasons described above, bright spots are less likely to appear in the area adjacent to the light entering surface.

In embodiment 1, the second tangent angle $\theta c2$ of the second portions of the cylindrical lenses 25 in the second light collecting region A2 is 67°, which is greater than the angle of tangent of the cylindrical lenses in comparative example 2. A degree of linearity adjustment to the light entering through the light entering surface is greater than the degrees of linearity adjustment in comparative example 1 and 2. Therefore, the light is further less likely to be diffused in the X-axis direction. The greater degree of linearity adjustment is performed to the rays of light in the second portions of the cylindrical lenses 25 in the second light collecting region A2 adjacent to the light entering surface 15A and the light is less likely to be diffused in the X-axis direction. Therefore, the rays of light are less likely to overlap each other. From the reasons described above, bright spots are less likely to appear in the area adjacent to the light entering surface 15A.

With the light guide plate 15 having the configuration described earlier, the light use efficiency and the luminance improve in comparison to the light guide plate that diffuse light in the second direction.

In addition to the advantageous effects of this embodiment described earlier, this embodiment exerts the following advantageous effects.

The first lens sections 21A exclusively include the cylindrical lenses 25 and thus design of the mold to form the light guide plate 15 is simplified in comparison to a configuration that the first lens sections 21A include the cylindrical lenses 25 and other types of lenses. Further, the production of the light guide plate 15 is simplified.

When the rays of light in the light guide plate 15 reach the first lens sections 21A on the light exiting surface 15B, the first lens sections 21A perform the linearity adjustment to the rays of light to travel along the first direction. When the rays of light in the light guide plate 15 reach the second lens sections 22A on the opposite plate surface 15C, the second lens sections 22A perform the linearity adjustment to the rays of light to travel along the first direction. According to the configuration, the light use efficiency and the luminance of the exiting light improve.

If the positions of the LEDs 13 relative to the light entering surface 15A are not constant, the amount of light from the LED 13 farther from the light entering surface 15A may be less than the amount of light from other LEDs 13 resulting in a dark stripe in the area opposed to the LED 13 farther from the light entering surface 15A. The first lens portion 21 performs the linearity adjustment to the rays of light at the less degree in the first light collecting region A1 in comparison to the second light collecting region A2. Therefore, the rays of light are more likely to be diffused in the second direction in the first light collecting regions A1. Although the second lens portion 22 performs the linearity adjustment to the rays of light, the dark stripe is less likely to appear in the area opposite the LED 13 farther from the light entering surface 15A.

The light guide plate 15 includes the light reflecting portions 23 that include the reflecting sections 23A arranged at intervals in the first direction. The light reflecting portions 23 reflect the light toward the light exiting surface 15B so that the light exits through the light exiting surface 15B. According to the configuration, the light properly exits through the light exiting surface 15B.

The rays of light in the light guide plate 15 traveling along the first direction may be reflected by the inclined surfaces of the inclined portions 24 and directed away from the LEDs 13 in the first direction. According to the configuration, the rays of light exiting through the light exiting surface 15B are less likely to be concentrated in the area adjacent to the LEDs 13. The angle of the inclined surfaces of the inclined portions 24 relative to a plane extending in the first direction and the second direction is less than the light reflecting surfaces of the reflecting sections 23A relative to the plane. Therefore, the inclined surfaces of the inclined portions 24 can direct the rays of light farther away from the LEDs 13.

The rays of light in the light guide plate 15 traveling along the first direction away from the LEDs 13 may be reflected by the first reflecting surfaces 23A1 of the reflecting sections 23A toward the light exiting surface 15B. The rays of light in the light guide plate 15 traveling along the first direction toward the LEDs 13 may be reflected by the second reflecting surfaces 23A2 of the reflecting sections 23A toward the light exiting surface 15B. The angle of the first reflecting surfaces 23A1 is less than the angle of the second reflecting surfaces 23A2. Therefore, the rays of light are reflected by the first reflecting surfaces 23A1 at an angle less than an angle of the rays of light reflected by the second reflecting surfaces 23A2. Even if the number of the rays of light traveling along the first direction away from the LEDs 13 is greater than the number of the rays of light traveling in the opposite direction, the excessive rays of light traveling along the first direction away from the LEDs 13 are less likely to be directed toward the light exiting surface 15B.

The angle of the second reflecting surfaces 23A2 is greater than the angle of the first reflecting surfaces 23A1. Therefore, the rays of light are reflected by the second reflecting surfaces 23A2 at the angle greater than the angle of the rays of light reflected by the first reflecting surfaces 23A1. Even if the number of the rays of light traveling along the first direction toward the LEDs 13 is less than the number of the rays of light traveling in the opposite direction, the rays of light traveling along the first direction toward the LEDs 13 are properly directed toward the light exiting surface 15B. With the first reflecting surfaces 23A1 and the second reflecting surfaces 23A2, the light use efficiency improves.

The liquid crystal display device 10 includes the backlight 12 described above and the liquid crystal panel 11 using the light from the backlight 12. Because the backlight 12 emits the light with the uniform luminance, the liquid crystal display device 10 displays images with high display quality.

The light guide plate 15 may be replaced with a light guide plate that includes the second lens sections 22A on a light exiting surface and the first lens sections 21A on an opposite plate surface. According to the configuration, when rays of light in the light guide plate reach the first lens sections 21A of the opposite exiting surface, the first lens sections 21A perform the linearity adjustment to the rays of light to travel along the first direction. When the rays of light in the light guide plate reach the second lens sections 22A of the light exiting surface, the second lens sections 22A perform the linearity adjustment to the rays of light to travel along the first direction. Therefore, the light use efficiency and the luminance of the exiting light improve.

If the positions of the LEDs 13 relative to a light entering surface of the light guide plate are not constant, the amount of light from the LED 13 farther from the light entering surface may be less than the amount of light from other LEDs 13 resulting in a dark stripe in the area opposed to the LED 13 farther from the light entering surface. The first lens sections 21A perform the linearity adjustment to the rays of light at the less degree in the first light collecting regions A1 in comparison to the second light collecting regions A2. Therefore, the rays of light are more likely to be diffused in the second direction in the first light collecting regions A1. Although the second lens sections 22A perform the linearity adjustment to the rays of light, the dark stripe is less likely to appear in the area opposed to the LED 13 farther from the light entering surface.

Second Embodiment

A second embodiment will be described with reference to FIGS. 22 to 26. The second embodiment includes a light guide plate 115 that includes first lens sections 121A having a configuration different from the first lens sections 21A in the first embodiment. Configuration, functions, operation, and effects similar to those of the first embodiment will not be described.

Figure 22:
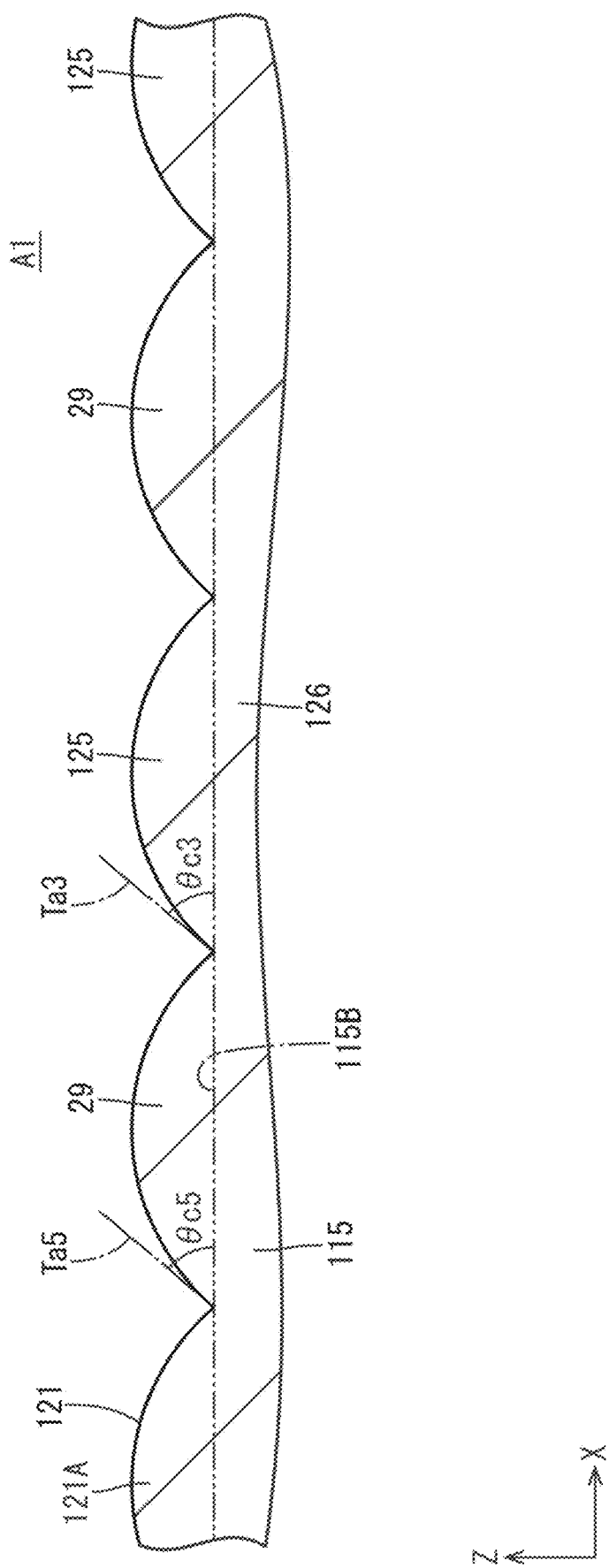
FIG. 22 is a cross-sectional view of first light collecting regions of first lens sections of a first lens portion cut in the X-axis direction.
Figure 23:
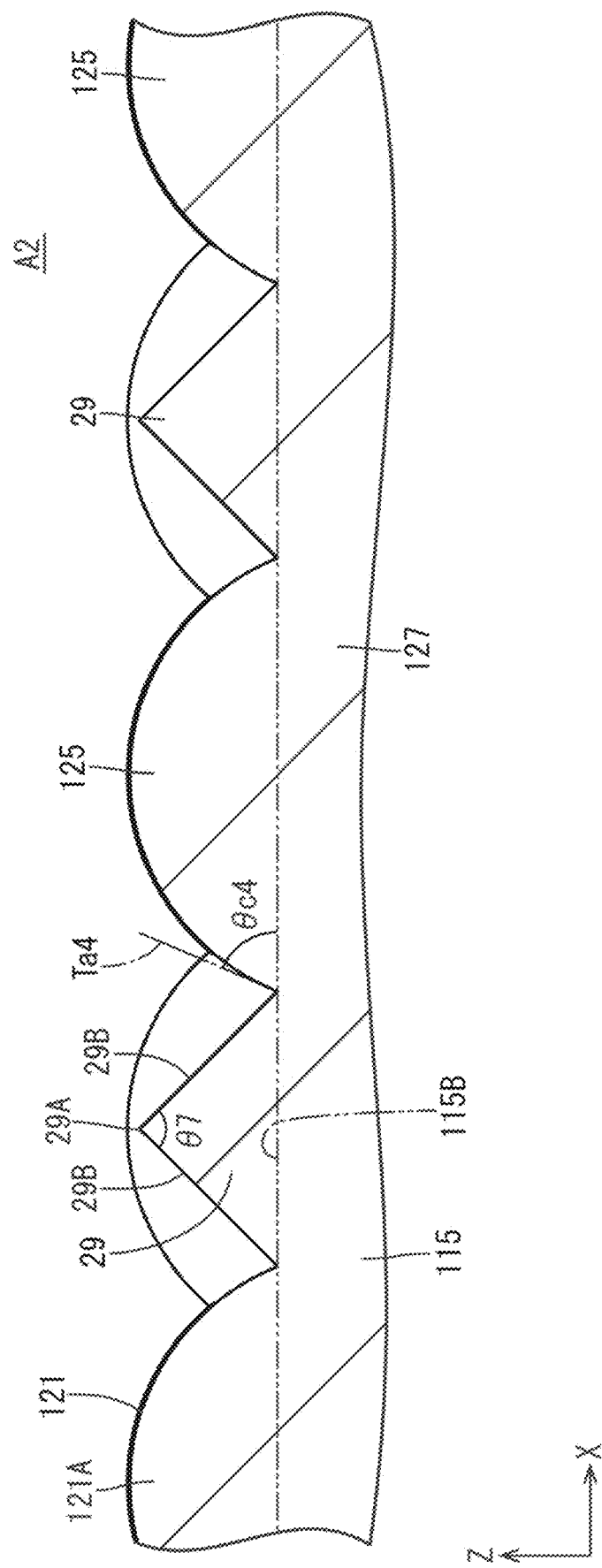
FIG. 23 is a cross-sectional view of second light collecting regions of the first lens sections cut in the X-axis direction.

The light guide plate 115 includes a first lens portion 121 that includes the first lens sections 121A. As illustrated in FIGS. 22 and 23, the first lens sections 121A include cylindrical lenses 125 and complex lenses 29. The cylindrical lenses 125 extend in the Y-axis direction. The cylindrical lenses 125 are arranged in the X-axis direction. The cylindrical lenses 125 include curved peripheries. The cylindrical lenses 125 include first portions that are in first light collecting region A1 opposite the display area AA and the non-display area NAA and second portions that are in second light collecting sections opposite the non-display area NAA.

The complex lenses 29 extend in the Y-axis direction. The complex lenses 29 are arranged in the X-axis direction. the complex lenses 29 include half rod portions and triangular prism portions. Each of the half rod portions has a half rod shape with a semicircular cross section along the X-axis direction. Each of the triangular prism portions has a triangular prism shape with a triangular cross section along the X-axis direction. Specifically, the half rod portions of the complex lenses 29 are in the first light collecting regions A1 opposite the display area AA and the non-display area NAA. The triangular prism portions of the complex lenses 29 are in the second light collecting regions A2 opposite the non-display area NAA. The half rod portions of the complex lenses 29 include peripheries similar to the peripheries of the cylindrical lenses 125. The triangular prism portions of the complex lenses 29 include inclined surfaces 29B. The inclined surfaces 29B of each complex lens 29 are angled toward each other to define a vertex 29A. The shapes of the half rod portions and the triangular prism portions gradually change at borders between the half rod portions and the triangular prism portions.

The complex lenses 29 having such a configuration totally and repeatedly reflect rays of light with the inclined surfaces 29B so that the rays of light travel along the Y-axis direction. In comparison to the cylindrical lenses 125, the complex lenses 29 perform a greater degree of linearity adjustment to the rays of light in the second light collecting regions A2. The rays of light from the LEDs 113 and entering the light guide plate 115 through a light entering surface 115A are less likely to be diffused in the X-axis direction and overlap each other in an area adjacent to the light entering surface 115A. According to the configuration, bright spots are less likely to appear in the second light collecting regions A2.

The half rod portions of the complex lenses 29 include curved peripheries. The half rod portions perform the linearity adjustment to the rays of light at a degree similar to a degree of the linearity adjustment to the rays of light by the cylindrical lenses 125. The complex lenses 29 having such a configuration are adjacent to the cylindrical lenses 125 in the X-axis direction. The cylindrical lenses 125 and the complex lenses 29 of the first lens sections 121A are alternately arranged in the X-axis direction. The second portions of the cylindrical lenses 125 and the half rod portions of the complex lenses 29 perform the linearity adjustment at different degrees. Therefore, the bright spots are further less likely to appear in the area adjacent to the light entering surface 115A. The number of the cylindrical lenses 125 and the number of the complex lenses 29 are about equal to each other.

As illustrated in FIGS. 22 and 23, an angle of a tangent line Ta3 to a curved surface of the first portion of each cylindrical lens 125 is defined as a third tangent angle θc3. The third tangent angle θc3 is in a range from 30° to 50°, for instance, about 48°. An angle of a tangent line Ta4 to a curved surface of the second portion of each cylindrical lens 125 is defined as a fourth tangent angle θc4. The fourth tangent angle θc4 is in a range from 55° to 70°, for instance, about 67°. The first portions of the cylindrical lenses 125 have a height of about 0.00914 mm and a curvature radius of about 0.027 mm. The second portions of the cylindrical lenses 125 have a height of about 0.017 mm and a curvature radius of about 0.027 mm. Namely, the first portions and the second portions have different heights and the same curvature radius. Intervals between the first portions of the cylindrical lenses 125 in the X-axis direction and intervals between the second portions of the cylindrical lenses 125 in the X-axis directions are constant. The intervals may be about 0.82 mm.

As illustrated in FIGS. 22 and 23, an angle of a tangent line Ta5 to a curved surface of the half rod portions of the complex lenses 29 is defined as a fifth tangent angle θc5. The fifth tangent angle θc5 is in a range from 30° to 50°, for instance, about 48°. Namely, the third tangent angle θc3 of the first portions of the cylindrical lenses 125 and the fifth tangent angle θc5 of the half rod portions of the complex lenses 29 are equal to each other. According to the configuration, the degrees of the linearity adjustment by the first portions of the cylindrical lenses 125 and the half rod portions of the complex lenses 29 are about equal. Even if the positions of the LEDs 113 relative to the light entering surface 115A are not constant, a dark stripe is less likely to appear in an area adjacent to the LED 113 farther from the light entering surface 115A.

The half rod portions of the complex lenses 29 have a height of about 0.00914 mm and a curvature radius of about 0.027 mm. Namely, the half rod portions of the complex lenses 29 have the shape and the dimension about equal to the shape and the dimensions of the first portions of the cylindrical lenses 125. The triangular prism portions of the complex lenses 29 have a height of about 0.017 mm and a vertex angle θ7 in a range from 80° to 100°, for instance, about 90°.

If the vertex angle θ7 is greater than 100°, the degree of the linearity adjustment to the rays of light by the triangular prism portions of the complex lenses 29 may be less than the degree of the linearity adjustment to the rays of light by the second portions of the cylindrical lenses 125 depending on the fourth tangent angle θc4. In this embodiment, the vertex angle θ7 of the triangular prism portions of the complex lenses 29 is equal to or less than 100°. Therefore, the degree of the linearity adjustment to the rays of light by the triangular prism portions of the complex lenses 29 is greater than the degree of the linearity adjustment to the rays of light by the second portions of the cylindrical lenses 125 regardless of the fourth tangent angle θc4. According to the configuration, bright spots are further less likely to appear in the area adjacent to the light entering surface 115A.

If the vertex angle θ7 of the triangular prism portions of the complex lenses 29 is less than 80°, reproducibility of shape of the triangular prism portions of the complex lenses 29 in molding of the light guide plate 115 may be reduced resulting in difficulty in molding of the light guide plate 115. In this embodiment, the vertex angle θ7 of the triangular prism portions of the complex lenses 29 is equal to or greater than 80°. Therefore, a greater level of the reproducibility of shape of the triangular prism portions of the complex lenses 29 in molding of the light guide plate 115 can be achieved and thus the light guide plate 115 can be easily produced.

The intervals between the half rod portions and the triangular prism portions of the complex lenses 29 in the X-axis direction are constant. The intervals may be about 0.082 mm. Namely, the cylindrical lenses 125 and the complex lenses 29 are arranged at equal intervals in the X-axis direction. The first portions and the second portions of the cylindrical lenses 125 and the half rod portions and the triangular prism portions of the complex lenses 29 are arranged at constant intervals in the X-axis direction. The intervals may be about 0.041 mm.

The light guide plate 115 includes a first light guide portion 126 and a second light guide portion 127. A difference in thickness between the first light guide portion 126 and the second light guide portion 127 is about 0.00786 mm. The difference in thickness is about equal to a difference in height between the first light collecting region A1 (the height of the first portions of the cylindrical lenses 125 or the half rod portions of the complex lenses 29, which is 0.00914 mm) and the second light collecting region A2 (the height of the second portions of the cylindrical lenses 125 or the triangular prism portions of the complex lenses 29, which is 0.017 mm). Therefore, the highest points in the first light collecting region A1 and the second light collecting region A2 of the first lens sections 121A (distances from a plate surface of the base portion of the light guide plate 115) are at the same height.

To observe how the linearity of the rays of light changed according to the vertex angle θ7 of the triangular prism portions of the complex lenses 29, comparative experiment 3 were conducted. In comparative experiment 3, the vertex angle θ7 was altered in a range from 70° to 110°. Specifically, the vertex angle θ7 was set to 70°, 80°, 90°, 95°, 100°, and 110°. The dimensions of the light guide plates used in comparative experiment 3 had the same dimensions except for the vertex angle θ7.

Figure 24:
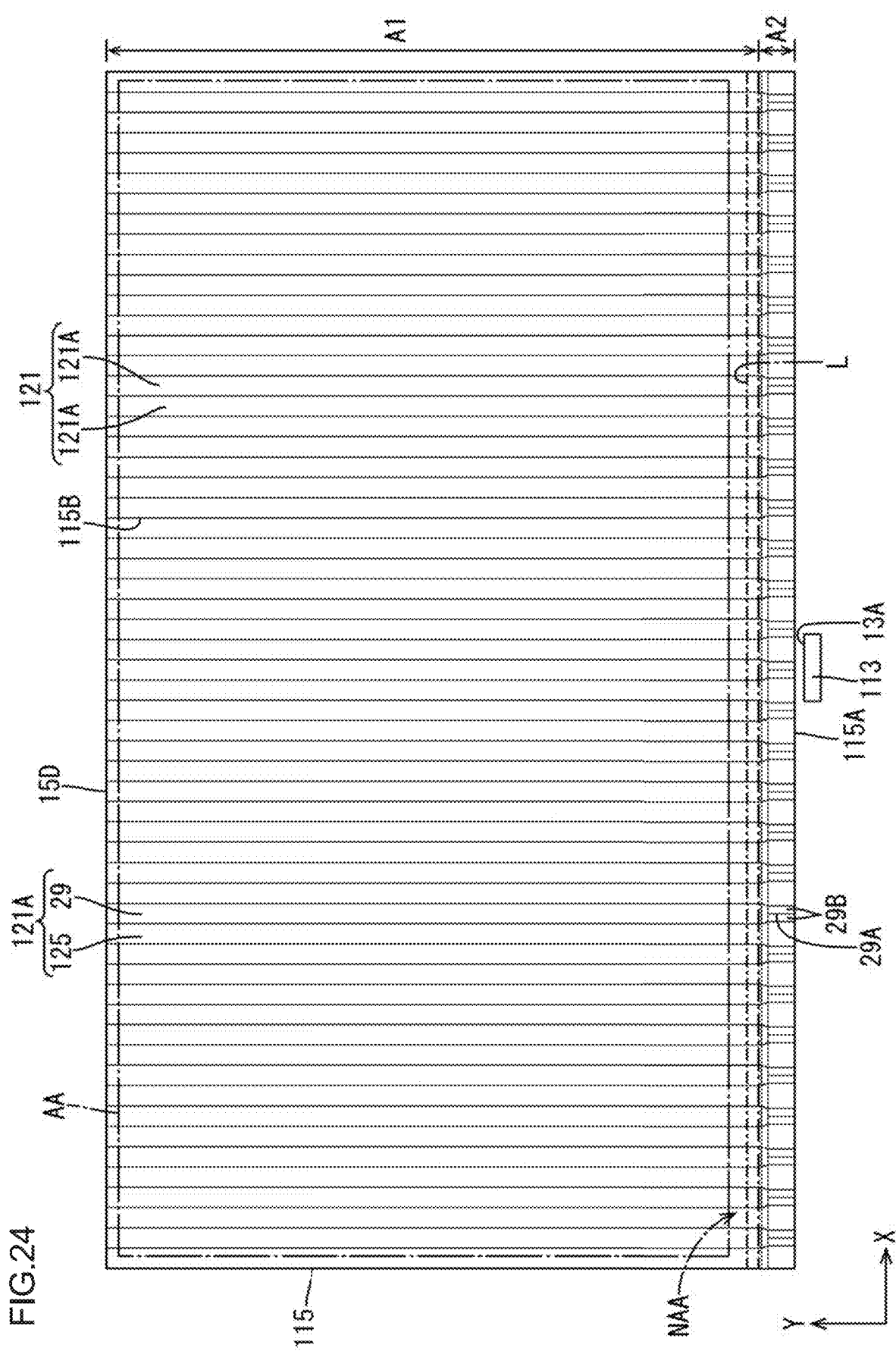
FIG. 24 is a plan view of LEDs and a light guide plate used in comparative experiment 3.

In comparative experiment 3, a single LED 113 was disposed opposite the middle of the light entering surface of each light guide plate with respect to the X-axis direction as illustrated in FIG. 24 and degrees of the linearity adjustment to rays of light by the complex lenses were determined. Specifically, luminance of light exiting from each light guide plate through the light exiting surface was measured after the LED 113 was turned on and a graph of distributions of luminance with respect to the X-axis direction at points 3 mm away from the light entering surface in the Y-axis direction (see dot-dash line L in FIG. 24) was created. The points 3 mm away from the light entering surface in the Y-axis direction are located in the non-display area NAA closer to the display area AA relative to the borders between the first light collecting region A1 and the second light colleting region A2.

Figure 25:
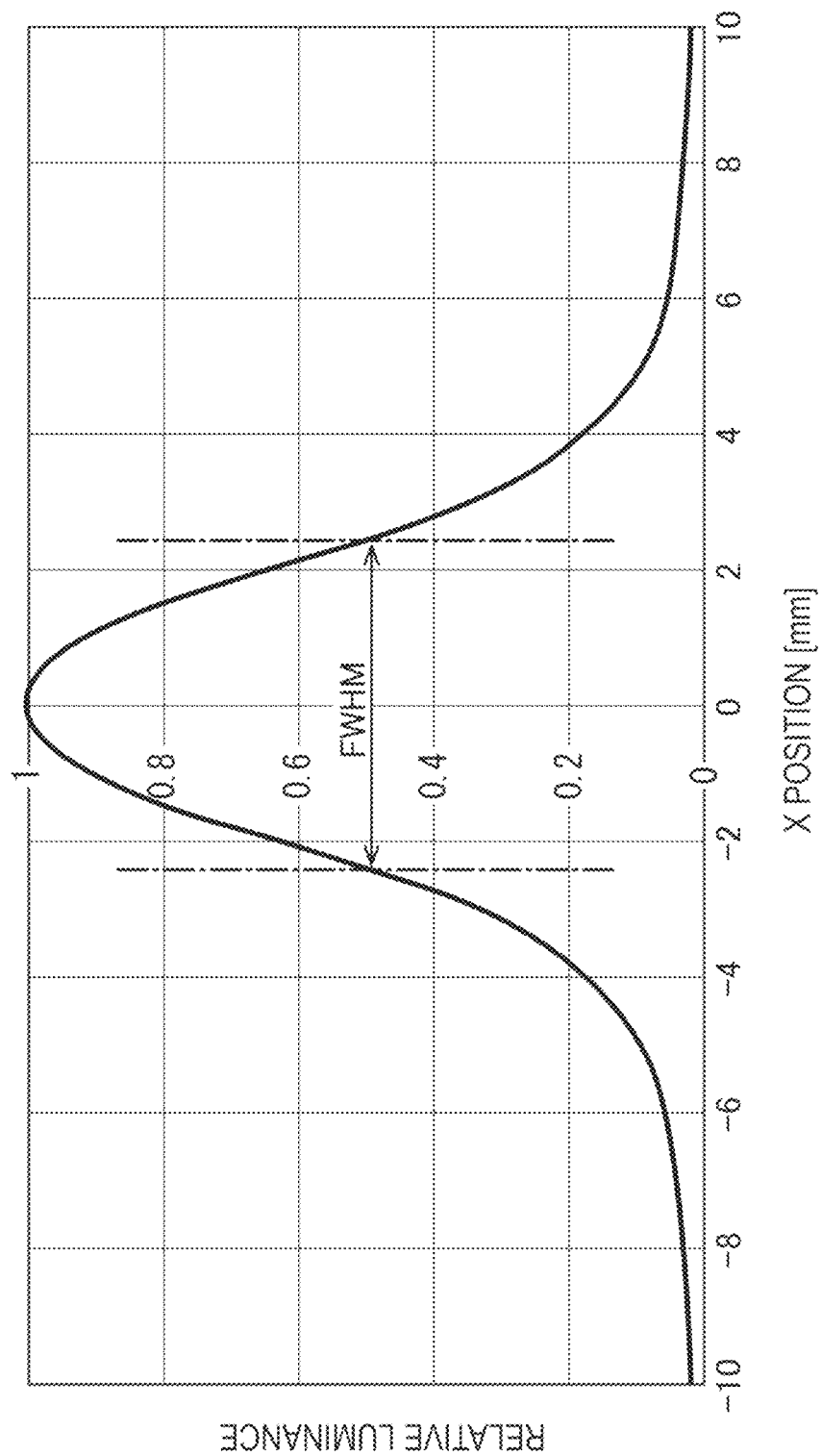
FIG. 25 is a graph presenting distributions of luminance in the X-axis direction in comparative experiment 3.

An example of the distributions of luminance with respect to the X-axis direction is illustrated in FIG. 25. In FIG. 25, the vertical axis represents relative luminance (no unit). Relative luminance values are defined relative to a luminance level at a point of 0 mm with respect to the X-axis direction (a front luminance level) on the light exiting surface 15B of the light guide plate 15 that includes the cylindrical lenses 25 that includes the second portions with the second tangent angle θc2 of 70°. The luminance level at the point of 0 mm will be referred to as a reference (1.0). In FIG. 25, the horizontal axis represents X positions in unit of mm, that is, distances from the middle (0 mm) with respect to the X-axis direction. Symbols – (minus) and + (plus) in FIG. 25 indicate the left side and the right side relative to the middle in FIG. 24, respectively.

The distributions of luminance with respect to the X-axis direction were created for all light guide plates including different degrees of the vertex angle θ7. Full width at half maximum (FWHM) values were extracted for all light guide plates. The results are present in FIG. 26. As the FWHM value decreases, the light is less likely to be diffused in the X-axis direction and the degree of the linearity adjustment to the rays of light by the complex lenses 29 tends to increase.

Figure 26:
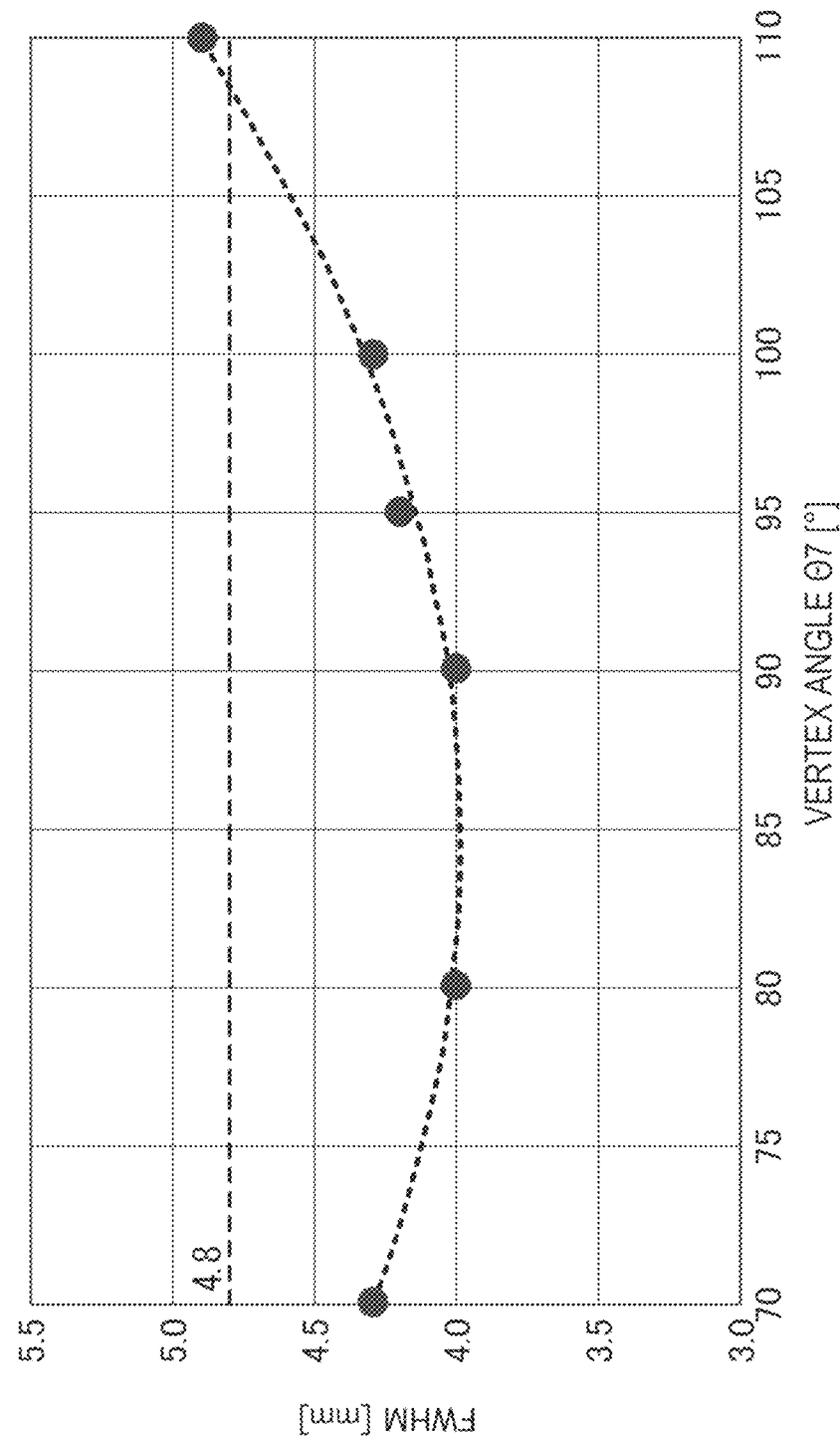
FIG. 26 is a graph presenting a relation between a vertex angle and half width at half maximum (FWHM) value.

In FIG. 26, the vertical axis represents FWHM values in unit of mm. The horizontal axis represents the vertex angle θ7 of the triangular prism portions of the complex lenses 29. A broken line in FIG. 26 represents a FWHM value (4.8 mm) extracted from the distribution of luminance with respect to the X-axis direction measured on the light guide plate 15 that includes the second portions of the cylindrical lenses 25 with the second tangent angle θc2 of 70°.

The results of comparative experiment 3 will be described. According to FIG. 26, the FWHM values of the light guide plates with the vertex angles θ7 in the range from 70° to 100° are less than the FWHM value of the light guide plate 15 with the second tangent angle θc2 of 70°. The second light collecting region A2 of the cylindrical lenses 25 in the light guide plate 15 with the second tangent angle θc2 of 70° preforms the highest degree of the linearity adjustment among the light guide plates in the comparative experiments 1 and 2.

In comparison to the light guide plate 15 that includes the first lens sections 21A that exclusively include cylindrical lenses 25, the degrees of the linearity adjustment by the light guide plates with the vertex angles θ7 in the range from 70° to 100° are greater and thus the light is less likely to be diffused in the X-axis direction. When the vertex angle θ7 is in the range from 80° to 90°, the FWHM value is about 4 mm, which is the smallest. Therefore, the degree of the linearity adjustment is the greatest. This configuration is preferable for reducing bright spots in the area adjacent to the light entering surface 115A.

If the vertex angle θ7 of the triangular prism portions of the complex lenses 29 is less than 80°, reproducibility of shape of the triangular prism portions of the complex lenses 29 in molding of the light guide plate 115 may be reduced resulting in difficulty in molding of the light guide plate 115. Therefore, it is preferable to set the vertex angle θ7 of the triangular prism portions of the complex lenses 29 in the range from 80° to 100° to obtain the uniformity of luminance of the exiting light and easiness in production of the light guide plate 115.

In the triangular prism portions of the complex lenses 29, the rays of light are repeatedly and totally reflected by the inclined surfaces 29B. Namely, the triangular prism portions of the complex lenses 29 perform a greater degree of the linearity adjustment to the rays of light in comparison to the cylindrical lenses 125. In the half rod portions of the complex lenses 29, the rays of light are reflected by the curved surfaces. Namely, the half rod portions of the complex lenses 29 perform the linearity adjustment at the degree similar to the degree of the linearity adjustment by the cylindrical lenses 125. With the cylindrical lenses 125 and the complex lenses 29, the bright spots are less likely to appear in the second light collecting region A2.

The third tangent angle θc3 of the cylindrical lenses 125 and the fifth tangent angle θc5 of the complex lenses 29 are equal to each other. According to the configuration, the degrees of the linearity adjustment by the first portions of the cylindrical lenses 125 and the half rod portions of the complex lenses 29 are about equal to each other. Even if the positions of the LEDs 113 relative to the light entering surface 115A are not constant, the dark stripe is less likely to appear in the area adjacent to the LED 113 farther from the light entering surface 115A.

The cylindrical lenses 125 and the complex lenses 29 are alternately arranged in the second direction. According to the configuration, the degrees of the linearity adjustment by the second portions of the cylindrical lenses 125 and the triangular prism portions of the complex lenses 29 are different from each other. Therefore, the bright spots are further less likely to appear in the area adjacent to the light entering surface 115A.

Other Embodiments

The technology described herein is not limited to the embodiments described in this specification and illustrated in the drawings. For example, the following embodiments may be included in the technical scope of the present invention.

(1) The first lens sections 21A or 121A may include middle light collecting regions (third light collecting regions) between the first light collecting regions A1 and the second light collecting regions A2 with respect to the first direction. The first lens sections 21A of 121A may perform linearity adjustment to rays of light in the light guide plate 15 or 115 to travel along the first direction in the third light collecting regions at a degree greater than the degree of the linearity adjustment in the first light collecting region A1 but less than the degree of the linearity adjustment in the second light collecting region A2.

(2) The intervals of the first lens sections 21A or 121A may be altered where appropriate.

(3) The intervals of the first lens sections 21A or 121A in the first light collecting region A1 or the second light collecting region A2 may be different from each other. It is preferable that the first light collecting region A1 continue to the second light collecting regions A2 at least in part to reduce leakages of light. However, the continuity between the first light collecting regions A1 and the second light collecting regions A2 is not mandatory.

(4) The first lens sections 21A or 121A may be configured such that the borders between the first light collecting regions A1 and the second light collecting regions A2 are opposite the border between the display area AA and the non-display area NAA. Alternately, the first lens sections 21A or 121A may be configured such that the second light collecting regions A2 are opposite the display area AA and the non-display area NAA.

(5) The first lens sections 21A or 121A may include types of lenses different from the cylindrical lenses 25 or 125 and the complex lenses 29.

(6) The first tangent angle θc1 and the third tangent angle θc3 may be less than 30° or greater than 50°. The second tangent angle θc2 and the fourth tangent angle θc4 may be less than 55° or greater than 70°.

(7) The heights and the curvature radiuses of the lenses in the first light collecting regions A1 and the second light collecting regions A2 may be altered where appropriate.

(8) The vertex angle θ7 may be in a range from 80° to 100° (90°±10°). The vertex angle θ7 may be less than 80° or greater than 100°.

(9) The height and the curvature radius of the half rod portions of the complex lenses 29 in the first light collecting regions A1 and the height of the triangular prism portions of complex lenses 29 in the second light collecting regions A2 may be altered where appropriate.

(10) The third tangent angle θc3 and the fifth third tangent angle θc5 may be different from each other.

(11) The number of the cylindrical lenses 125 and the number of the complex lenses 29 may be different from each other.

(12) Groups of the cylindrical lenses 125 and groups of the complex lenses 29 may be alternately arranged. Groups of the cylindrical lenses 125 and the complex lenses 29 may be alternately arranged. The cylindrical lenses 125 and groups of the complex lenses 29 may be alternately arranged. The cylindrical lenses 125 and the complex lenses 29 may be randomly arranged.

(13) The first lens sections 121A may exclusively include the complex lenses 29.

(14) The border between the first light guide portion 26 and the second light guide portion 27 or between the first light guide portion 126 and the second light guide portion 127 may include a step or steps.

(15) The thicknesses of the first light guide portion 26 and the second light guide portion 27 of the light guide plate 15 may be altered where appropriate so that a difference in thickness between the first light guide portion 26 and the second light guide portion 27 other than the difference in thickness described earlier. The thicknesses of the first light guide portion 126 and the second light guide portion 127 of the light guide plate 115 may be altered where appropriate so that a difference in thickness between the first light guide portion 126 and the second light guide portion 127 other than the difference in thickness described earlier.

(16) The thicknesses of the first light guide portion 26 and the second light guide portion 27 of the light guide plate 15 may be equal to each other. The thicknesses of the first light guide portion 126 and the second light guide portion 127 of the light guide plate 115 may be equal to each other. The thickness of the second light guide portion 27 of the light guide plate 15 may be greater than the first light guide portion 26 of the light guide plate 15. The thickness of the second light guide portion 127 of the light guide plate 115 may be greater than the first light guide portion 126 of the light guide plate 115.

(17) The first lens portion 21 may be on the opposite plate surface 15C of the light guide plate 15 and the second lens portion 22 may be on the light exiting surface 15B of the light guide plate 15. The first lens portion 121 may be on an opposite plate surface 115C of the light guide plate 115 and the second lens portion 22 may be on a light exiting surface 115B of the light guide plate 115.

(18) The light reflecting portions 23 may be on the light exiting surface 15B of the light guide plate 15 or the light exiting surface 115B of the light guide plate 115.

(19) The light guide plate 15 may have a thickness that gradually decrease as a distance from the LEDs 13 increases so that the opposite plate surface 15C is sloped. The light guide plate 115 may have a thickness that gradually decrease as a distance from the LEDs 113 increases so that the opposite plate surface 15C is sloped.

(20) The reflective polarizing sheet 20 may include the multilayer film but not the polarizing film. In this case, a polarizing plate including a polarizing layer may be attached to the liquid crystal panel 11.

(21) The number, the sequence, and the kinds of the layers of the optical sheet component 17 may be altered where appropriate. For instance, the reflective polarizing sheet 20 may be omitted.

(22) Top emitting LEDs may be used for the LEDs 13 and 113 instead of the side emitting LEDs. Alternatively, organic light emitting diodes (OLEDs) may be used instead of the LEDs 13 or 113.

(23) The liquid crystal display device 10 and the backlight 12 may have shapes other than the rectangular shape, for instance, square, circular, oval, trapezoidal, or diamond shapes. When the shape of the backlight 12 is altered, the shapes of the light guide plate 15 or 115, the reflective sheet 16, and the optical sheet component 17 may be altered along with the shape of the backlight 12.

What is claimed is:

1. A lighting device comprising:
a light guide plate guiding rays of light; and
light sources arranged in a second direction and opposed to a light entering surface, wherein
the light guide plate comprises:
a base portion having a plate shape and including the light entering surface through which light enters the base portion and a light exiting surface through which the light exits the base portion, the light entering surface being at least one of side surfaces of the base portion, the light exiting surface being one of plate surfaces of the base portion; and
a light collecting portion protruding from the light exiting surface,
the light collecting portion includes light collecting sections elongated in a first direction parallel to a normal direction to the light entering surface and arranged in the second direction perpendicular to the first direction,
the light collecting sections perform linearity adjustment to the rays of light so that the rays of light travel along the first direction,
the light collecting sections include first light collecting regions and second light collecting regions,
the second light collecting regions are closer to the light entering surface than the first light collecting regions are, and
the second light collecting regions perform the linearity adjustment at a degree greater than a degree of the linearity adjustment performed by the first light collecting regions.

2. The lighting device according to claim 1, wherein
the light collecting sections include cylindrical lenses,
the cylindrical lenses each include first portions in the first light collecting regions and second portions in the second light collecting regions,
the first portions include first curved surfaces,
the second portions include second curved surfaces,
the first curved surfaces are defined with a first angle of tangent at a base of the first curved surfaces relative to the light exiting surface,
the second curved surfaces are defined with a second angle of tangent at a base of the second curved surfaces relative to the light exiting surface, and
the second angle of tangent is greater than the first angle of tangent.

3. The lighting device according to claim 2, wherein
the first angle of tangent is in a range from 30° to 50°, and
the second angle of tangent is in a range from 55° to 70°.

4. The lighting device according to claim 2, wherein the light collecting sections exclusively include the cylindrical lenses.

5. The lighting device according to claim 2, wherein
the light collecting sections include the cylindrical lenses and complex lenses,
the complex lenses include half rod portions in the first light collecting regions and triangular prism portions in the second light collecting regions,
the half rod portions of the complex lenses include curved surfaces, and
the triangular prism portions of the complex lenses include inclined surfaces angled toward each other to define vertexes.

6. The lighting device according to claim 5, wherein
the curved surfaces of the half rod portions of the complex lenses are defined with a third angle of tangent at a base of the curved surfaces relative to the light exiting surface, and
the first angle of tangent and the third angle of tangent are equal to each other.

7. The lighting device according to claim 5, wherein the cylindrical lenses and the complex lenses are alternately arranged in the second direction.

8. The lighting device according to claim 5, wherein the vertexes of the triangular prism portions of the complex lenses each have a vertex angle in a range from 80° to 100°.

9. The lighting device according to claim 1, wherein
the light guide plate includes a first light guide portion and a second light guide portion,
the first light guide portion includes the first light collecting regions,
the second light guide portion includes the second light collecting regions, and
the second light guide portion has a thickness less than a thickness of the first light guide portion.

10. The lighting device according to claim 1, wherein the first light collecting regions and the second light collecting regions are arranged at same intervals in the second direction.

11. The lighting device according to claim 1, wherein
the base portion of the light guide plate includes an opposite plate surface opposite the light exiting surface,
the light collecting portion that protrudes from the light exiting surface is defined as a first light collecting portion,
the light collecting sections included in the first light collecting portion are defined as first light collecting sections,
the light guide plate includes a second light collecting portion protrudes from the opposite plate surface,
the second light collecting portion includes second light collecting sections elongated in the first direction and arranged in the second direction, and
the second light collecting sections perform the linearity adjustment to the rays of light so that the rays of light travel along the first direction.

12. The lighting device according to claim 11, wherein
the light guide plate includes light reflecting portions that protrude from the opposite plate surface of the light guide plate,
the light reflecting portions are arranged at intervals in the first direction, and
the light reflecting portions include light reflecting sections that reflect the rays of light toward the light exiting surface.

13. The lighting device according to claim 12, wherein
the light guide plate includes inclined portions that protrude from the opposite plate surface,
the inclined portions are adjacent to the light reflecting sections in the first direction,
the inclined portions include inclined surfaces that incline such that a distance from the light exiting surface of the base portion of the light guide plate increases as a distance from the light sources increases,
the light reflecting sections include first light reflecting surfaces and second light reflecting surfaces,
the first light reflecting surfaces are closer to the light sources relative to the second light reflecting surfaces, respectively,
the first light reflecting surfaces are inclined toward the opposite plate surface,
the second light reflecting surfaces are adjacent to the first light reflecting surfaces in the first direction, respectively,
the second light reflecting surfaces are incline toward the opposite plate surface,
the inclined surfaces, the first light reflecting surfaces, and the second light reflecting surfaces are at angles relative to the opposite plate surface,
the second light reflecting surfaces and the opposite plate surface define an angle greater than an angle between the first light reflecting surfaces and the opposite plate surface, and
the inclined surfaces and the opposite plate surface define an angle less than the angle between the first light reflecting surfaces and the opposite plate surface.

14. A display device comprising:
the lighting device according to claim 1; and
a display panel displaying images using light from the lighting device.

15. The display device according to claim 14, wherein
the display panel includes a display area to display images and a non-display area surrounding the display area,
the first light collecting regions of the light collecting sections are opposed to the display area and the non-display area, and
the second light collecting regions of the light collecting sections are opposed to the non-display area.

16. A lighting device comprising:
a light guide plate guiding rays of light; and
light sources arranged in a second direction and opposed to a light entering surface, wherein
the light guide plate comprises:
  a base portion having a plate shape and including the light entering surface through which light enters the base portion, a light exiting surface through which the light exits the base portion, and an opposite plate surface opposite the light exiting surface, the light entering surface being at least one of side surfaces of the base portion, the light exiting surface being one of plate surfaces of the base portion, the opposite plate surface being another one of the plate surfaces of the base portion; and
  a light collecting portion protruding from the opposite plate surface, wherein
the light collecting portion includes light collecting sections elongated in a first direction parallel to a normal direction to the light entering surface and arranged in the second direction perpendicular to the first direction, the light collecting sections perform linearity adjustment to the rays of light so that the rays of light travel along the first direction, the light collecting sections include first light collecting regions and second light collecting regions, the second light collecting regions are closer to the light entering surface than the first light collecting regions are, and the second light collecting regions perform the linearity adjustment at a degree greater than a degree of the linearity adjustment performed by the first light collecting regions.

17. The lighting device according to claim 16, wherein the light collecting sections include cylindrical lenses, the cylindrical lenses each include first portions in the first light collecting regions and second portions in the second light collecting regions, the first portions include first curved surfaces, the second portions include second curved surfaces, the first curved surfaces are defined with a first angle of tangent at a base of the first curved surfaces relative to the opposite plate surface, the second curved surfaces are defined with a second angle of tangent at a base of the second curved surfaces relative to the opposite plate surface, and the second angle of tangent is greater than the first angle of tangent.

18. The lighting device according to claim 17, wherein the first angle of tangent is in a range from 30° to 50°, and the second angle of tangent is in a range from 55° to 70°.

19. The lighting device according to claim 17, wherein the light collecting sections exclusively include the cylindrical lenses.

20. The lighting device according to claim 17, wherein the light collecting sections include the cylindrical lenses and complex lenses, the complex lenses include half rod portions in the first light collecting regions and triangular prism portions in the second light collecting regions, the half rod portions of the complex lenses include curved surfaces, and the triangular prism portions of the complex lenses include inclined surfaces angled toward each other to define vertexes.

* * * * *